(12) United States Patent
Chan et al.

(10) Patent No.: US 10,783,360 B1
(45) Date of Patent: *Sep. 22, 2020

(54) APPARATUSES, SYSTEMS AND METHODS FOR VEHICLE OPERATOR GESTURE RECOGNITION AND TRANSMISSION OF RELATED GESTURE DATA

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/380,024

(22) Filed: Apr. 10, 2019

Related U.S. Application Data

(63) Continuation of application No. 15/657,550, filed on Jul. 24, 2017, now Pat. No. 10,296,785.

(51) Int. Cl.
| | | |
|---|---|---|
| *G06K 9/00* | (2006.01) | |
| *G06T 7/73* | (2017.01) | |
| *G06Q 40/08* | (2012.01) | |
| *G06K 9/62* | (2006.01) | |

(52) U.S. Cl.
CPC ..... *G06K 9/00335* (2013.01); *G06K 9/00771* (2013.01); *G06K 9/00845* (2013.01); *G06K 9/6202* (2013.01); *G06K 9/6277* (2013.01); *G06Q 40/08* (2013.01); *G06T 7/74* (2017.01); *G06K 9/6218* (2013.01); *G06T 2207/30196* (2013.01); *G06T 2207/30268* (2013.01)

(58) Field of Classification Search
CPC .......... G06K 9/00335; G06K 9/00845; G06K 9/6277; G06K 9/6202; G06K 9/00771; G06K 9/6218; G06T 2207/30268; G06T 2207/30196; G06T 7/74; G06Q 40/08
See application file for complete search history.

(56) References Cited

U.S. PATENT DOCUMENTS

| | | | | |
|---|---|---|---|---|
| 2007/0242944 A1* | 10/2007 | Mizusawa | ............ | H04N 13/239 396/234 |
| 2014/0309849 A1* | 10/2014 | Ricci | ....................... | H04L 67/10 701/33.4 |
| 2015/0098609 A1* | 4/2015 | Sarratt | ............... | G06K 9/00369 382/103 |
| 2017/0031361 A1* | 2/2017 | Olson | ................ | G06K 9/00791 |

* cited by examiner

*Primary Examiner* — Amara Abdi
(74) *Attorney, Agent, or Firm* — Marshall, Gerstein & Borun LLP

(57) ABSTRACT

Apparatuses, systems and methods are provided for vehicle operator gesture recognition and transmission of related gesture data. More particularly, apparatuses, systems and methods are provided for vehicle operator gesture recognition and transmission of related gesture data based on classification of image data.

17 Claims, 22 Drawing Sheets

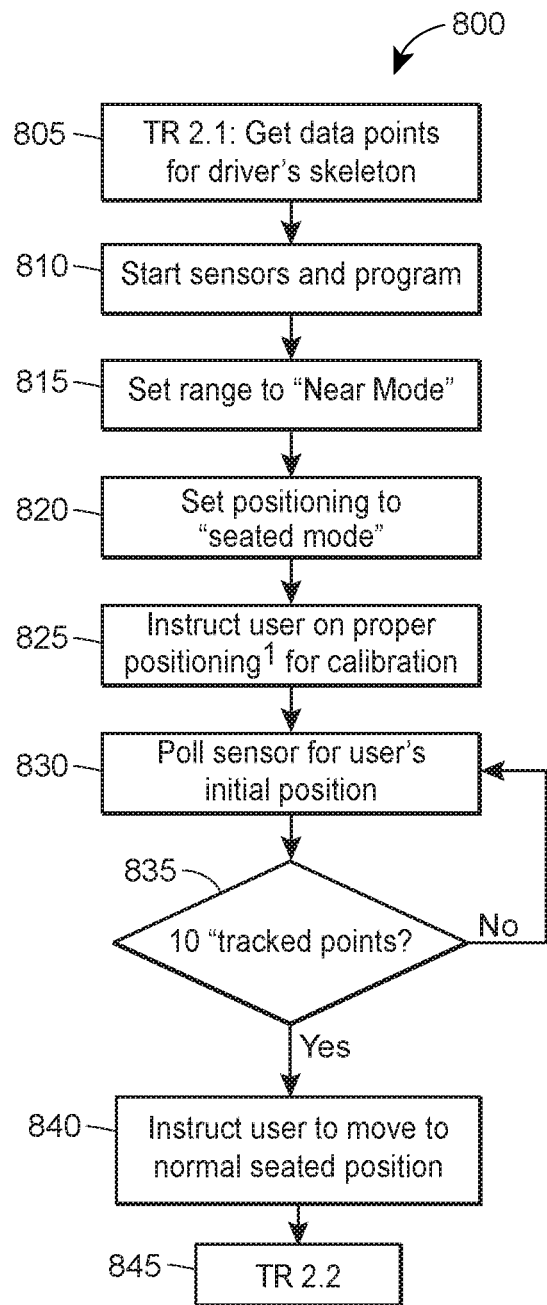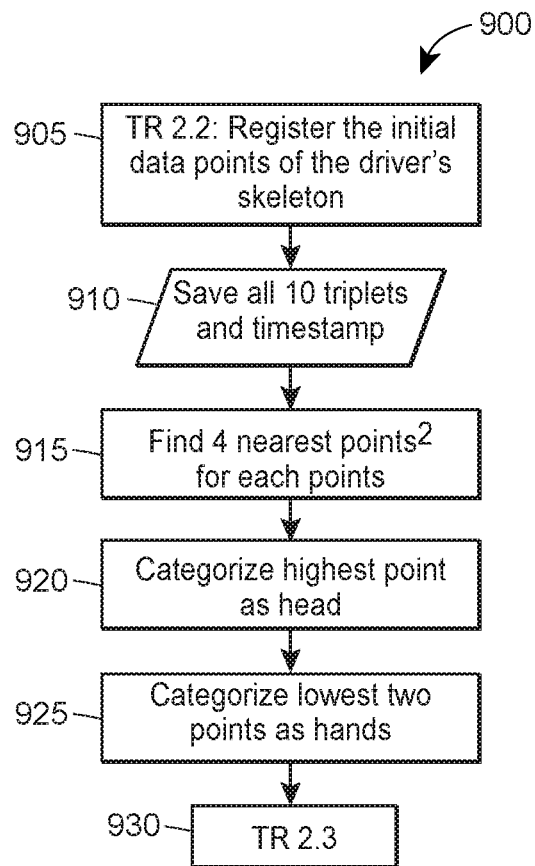
FIG. 8
FIG. 9

APPARATUSES, SYSTEMS AND METHODS FOR VEHICLE OPERATOR GESTURE RECOGNITION AND TRANSMISSION OF RELATED GESTURE DATA

CROSS REFERENCE TO RELATED APPLICATION

The present application is a continuation of U.S. patent application Ser. No. 15/657,550, entitled APPARATUSES, SYSTEMS AND METHODS FOR VEHICLE OPERATOR GESTURE RECOGNITION AND TRANSMISSION OF RELATED GESTURE DATA, filed Jul. 24, 2017, the disclosure of which is incorporated herein in its entirety by reference.

The present application is related to U.S. patent application Ser. No. 14/994,299, entitled APPARATUSES, SYSTEMS AND METHODS FOR ACQUIRING IMAGES OF OCCUPANTS INSIDE A VEHICLE, filed Jan. 13, 2016; Ser. No. 14/994,305, entitled APPARATUSES, SYSTEMS AND METHODS FOR CLASSIFYING DIGITAL IMAGES, filed Jan. 13, 2016; Ser. No. 14/994,308, entitled APPARATUSES, SYSTEMS AND METHODS FOR CLASSIFYING DIGITAL IMAGES, filed Jan. 13, 2016; Ser. No. 14/994,310, entitled APPARATUSES, SYSTEMS AND METHODS FOR COMPRESSING IMAGE DATA THAT IS REPRESENTATIVE OF A SERIES OF DIGITAL IMAGES, filed Jan. 13, 2016; Ser. No. 14/994,409, entitled APPARATUSES, SYSTEMS AND METHODS FOR DETERMINING DISTRACTIONS ASSOCIATED WITH VEHICLE DRIVING ROUTES, filed Jan. 13, 2016; Ser. No. 14/994,415, entitled APPARATUSES, SYSTEMS AND METHODS F OR GENERATING DATA REPRESENTATIVE OF VEHICLE DRIVER RATINGS, filed Jan. 13, 2016; Ser. No. 14/994,419, entitled APPARATUSES, SYSTEMS AND METHODS FOR GENERATING DATA REPRESENTATIVE OF VEHICLE OCCUPANT POSTURES, filed Jan. 13, 2016; Ser. No. 14/994,424, entitled APPARATUSES, SYSTEMS AND METHODS FOR TRANSITIONING BETWEEN AUTONOMOUS AND MANUAL MODES OF VEHICLE OPERATION, filed Jan. 13, 2016; Ser. No. 14/994,431, entitled APPARATUSES, SYSTEMS AND METHODS FOR DETERMINING WHETHER A VEHICLE IS BEING OPERATED IN AUTONOMOUS MODE OR MANUAL MODE, filed Jan. 13, 2016; Ser. No. 14/994,436, entitled APPARATUSES, SYSTEMS AND METHODS FOR DETERMINING VEHICLE OPERATOR DISTRACTIONS, filed Jan. 13, 2016; Ser. No. 14/994,440, entitled APPARATUSES, SYSTEMS AND METHODS FOR DETERMINING WHETHER A VEHICLE SYSTEM IS DISTRACTING TO A VEHICLE OPERATOR, filed Jan. 13, 2016; Ser. No. 14/862,949, entitled SYSTEMS AND METHODS FOR USING IMAGE DATA TO GENERATE VEHICLE OPERATION LOGS, filed Sep. 23, 2015; and Ser. No. 14/989,524, entitled SYSTEMS AND METHODS FOR ASSOCIATING VEHICLE OPERATORS WITH DRIVING MISSES INDICATED IN VEHICLE OPERATION DATA, filed Jan. 6, 2016; the disclosures of which are incorporated herein in their entireties by reference thereto.

TECHNICAL FIELD

The present disclosure is directed to apparatuses, systems and methods for vehicle operator gesture recognition and transmission of related gesture data. More particularly, the present disclosure is directed to apparatuses, systems and methods for vehicle operator gesture recognition and transmission of related gesture data based on classification of digital image data.

BACKGROUND

Vehicles are being provided with more complex systems. For example, vehicles commonly include a plethora of entertainment systems, such as stereos, USB interfaces for mobile telephones, video players, etc. Vehicles often have a host of other operator interfaces, such as emergency calling systems, vehicle navigation systems, heating and air conditioning systems, interior and exterior lighting controls, air bags, seatbelts, etc.

Vehicle operating environments are becoming more complex as well. For example, some roadways include u-turn lanes, round-a-bouts, no-left turn, multiple lanes one way in the morning and the other way in the afternoon, etc. Increases in traffic are also contributing to increased complexity.

These additional complexities contribute to increases in driver risk. What is needed are methods and systems for generating data representative of vehicle in-cabin insurance risk evaluations based on data representative of skeletal diagrams of a driver that are indicative of degrees of driver risk.

SUMMARY

A device for determining vehicle operator gestures and providing the vehicle operator gestures to at least one individual other than the vehicle operator may include a previously classified image data receiving module stored on a memory that, when executed by a processor, causes the processor to receive previously classified image data from at least one previously classified image database. The previously classified image data may be representative of previously classified vehicle operator gestures. The device may also include a current image data receiving module stored on a memory that, when executed by a processor, causes the processor to receive current image data from at least one vehicle interior sensor. The current image data may be representative of current vehicle operator gestures. The device may further include a current image data classification module stored on a memory that, when executed by a processor, causes the processor to classify the current image data by comparing the current image data to the previously classified image data. The currently classified image data may be representative of at least one current vehicle operator gesture. The device may yet further include a currently classified image data transmission module stored on a memory that, when executed by a processor, causes the processor to transmit the currently classified image data to at least one individual other than the vehicle operator.

In another embodiment, a computer-implemented method for determining vehicle operator gestures and for transmitting the vehicle operator gestures to at least one individual other than the vehicle operator may include receiving, at a processor of a computing device, previously classified image data from at least one previously classified image database in response to the processor executing a previously classified image data receiving module. The previously classified image data is representative of previously classified vehicle operator gestures. The method may also include receiving, at a processor of a computing device, current image data from at least one vehicle interior sensor a current image data receiving module, in response to the processor executing a current image data receiving module. The current image data may be representative of at least one current vehicle operator gesture. The method may further include classifying, using a processor of a computing device, at least one gesture associated with a vehicle operator, based on a comparison of the current image data with the previously classified image data, in response to the processor executing a current image data classification module. The method may yet further include transmitting, using a processor of a computing device, the currently classified image data to at least one individual other than the vehicle operator, in response to the processor executing a currently classified image data transmission module.

In a further embodiment, a non-transitory computer-readable medium storing computer-readable instructions that, when executed by a processor, cause the processor to determine degrees of vehicle operator risk may include a previously classified image data receiving module that, when executed by a processor, causes the processor to receive previously classified image data from at least one previously classified image database. The previously classified image data is representative of previously classified vehicle operator risk. The non-transitory computer-readable medium may also include a current image data receiving module that, when executed by a processor, causes the processor to receive current image data from at least one vehicle interior sensor. The current image data may be representative of current vehicle operator risk. The non-transitory computer-readable medium may further include a current image data classification module that, when executed by a processor, causes the processor to classify the current image data by comparing the current image data to the previously classified image data. The currently classified image data is representative of at least one current vehicle operator gesture. The non-transitory computer-readable medium may yet further include a currently classified image data transmission module that, when executed by a processor, causes the processor to transmit the currently classified image data to at least one individual other than the vehicle operator.

BRIEF DESCRIPTION OF THE FIGURES

FIGS. 8-10 depict flow diagrams for example methods for tracking movement of a vehicle driver's upper body;

DETAIL DESCRIPTION

Apparatuses, systems and methods for generating data representative of degrees of vehicle operator risks may include the following capabilities: 1) determine whether a vehicle driver is looking at a road (i.e., tracking the driver's face/eyes, with emphasis on differentiating between similar actions, such as a driver who is adjusting a radio while looking at the road versus adjusting the radio while not looking at the road at all); 2) determine whether a driver's hands are empty (e.g., including determining an approximate size/shape of object in a driver's hands to, for example, differentiate between a cell phone and a large cup, for example); 3) identify a finite number of driver postures; and 4) logging rotated and scaled postures that are normalized for a range of different drivers.

An associated mobile application may accommodate all popular platforms, such as iOS, Android and Windows, to connect an onboard device to a cell phone. In addition, to act as data connection provider to remote servers, the mobile application may provide a user friendly interface for reporting and troubleshooting. Accordingly, associated memory, processing, and related data transmission requirements are reduced compared to previous approaches.

Figure 1:
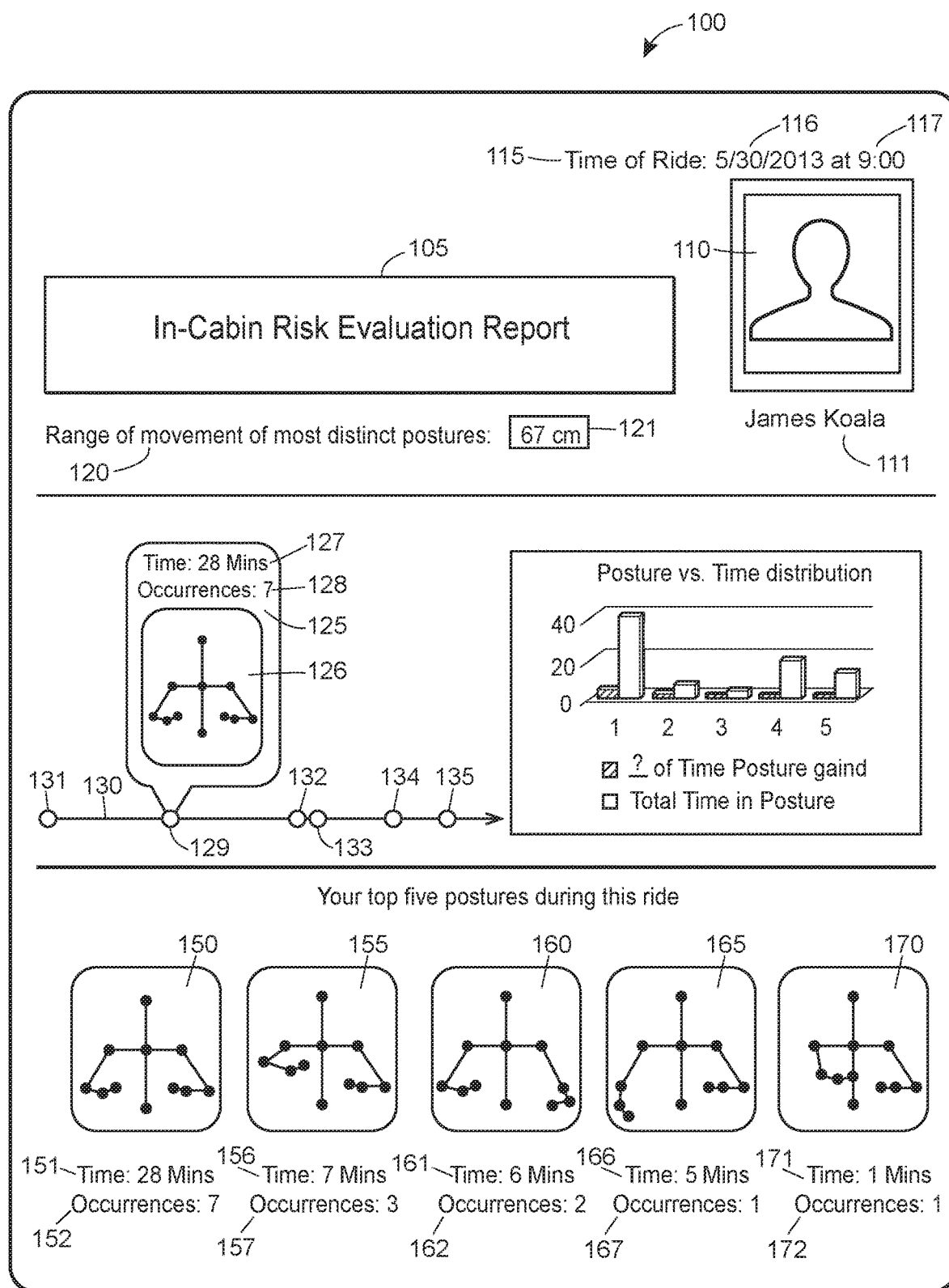
FIG. 1 depicts an example report for a vehicle in-cabin insurance risk evaluation.

Turning to FIG. 1, an example report 100, representative of vehicle in-cabin insurance risk evaluation, is depicted. The report 100 may include a title 105 (e.g., In-Cabin Risk Evaluation Report), a photograph of a driver 110, a name of a driver 111, and a drive identification 115 including, for example, a calendar date 116 and a time 117. The report 100 may also include value 121 (e.g., 67 centimeters) for a range of movement of most distinct postures 120. The report 100 is a chronological diagram 130 of various driver postures 129, 131, 132, 133, 134, 135 including details of a driver posture that the driver was in for the longest total time 125. The driver posture that the driver was in for the longest total time 125 may include a skeletal FIG. 126 representing the posture, a total elapsed time 127, and a number of individual occurrences of the posture 128. The report 100 may further include a graph 140 (e.g., a bar chart) including a title (e.g., posture vs. time distribution), a number of times a given posture was determined 142, and a total time in a given posture 143. The report 100 may also include the top five postures during an associated ride 145 including skeletal figures representative of the respective postures 150, 155, 160, 165, 170, a time in any given posture during an associated ride 151, 156, 161, 166, 171, and a number of occurrences of any given posture during an associated ride 152, 157, 162, 167, 172.

Figure 2:
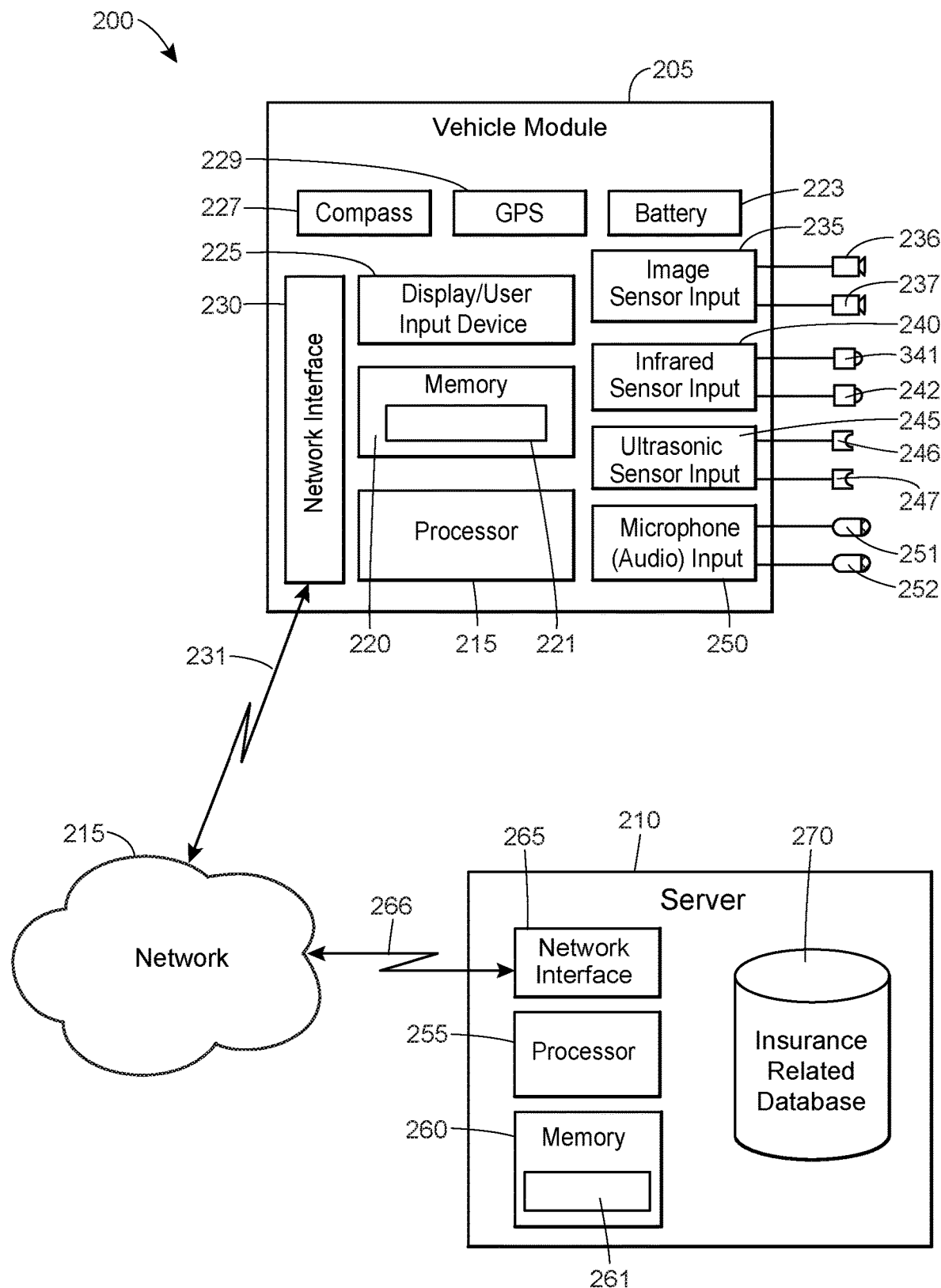
FIG. 2 depicts a high-level block diagram for an example computer system for generating data representative of vehicle in-cabin insurance risk evaluations.

With reference to FIG. 2, a high-level block diagram of vehicle in-cabin system 200 is illustrated that may implement communications between a vehicle in-cabin device 205 and a remote computing device 210 (e.g., a remote server) to provide vehicle in-cabin device 205 location and/or orientation data, and vehicle interior occupant position data to, for example, an insurance related database 270. The vehicle in-cabin system 200 may acquire data from a vehicle in-cabin device 205 and generate three dimensional (3D) models of a vehicle interior and occupants within the vehicle interior. The vehicle in-cabin system 200 may also acquire data from a microphone 251, 252 and determine a source of sound and volume of sound within a vehicle interior.

For clarity, only one vehicle in-cabin device 205 is depicted in FIG. 2. While FIG. 2 depicts only one vehicle in-cabin device 205, it should be understood that any number of vehicle in-cabin devices 205 may be supported. The vehicle in-cabin device 205 may include a memory 220 and a processor 225 for storing and executing, respectively, a module 221. The module 221, stored in the memory 220 as a set of computer-readable instructions, may be related to a vehicle interior and occupant position data collecting application that, when executed on the processor 225, causes vehicle in-cabin device location data to be stored in the memory 220. Execution of the module 221 may also cause the processor 225 to generate at least one 3D model of at least a portion of a vehicle occupant (e.g., a driver and/or passenger) within the vehicle interior. Execution of the module 221 may further cause the processor 225 to associate the vehicle in-cabin device location data with a time and, or date. Execution of the module 221 may further cause the processor 225 to communicate with the processor 255 of the remote computing device 210 via the network interface 230, the vehicle in-cabin device communications network connection 231 and the wireless communication network 215.

The vehicle in-cabin device 205 may also include a compass sensor 227, a global positioning system (GPS) sensor 229, and a battery 223. The vehicle in-cabin device 205 may further include an image sensor input 235 communicatively connected to, for example, a first image sensor 236 and a second image sensor 237. While two image sensors 236, 237 are depicted in FIG. 2, any number of image sensors may be included within a vehicle interior monitoring system and may be located within a vehicle interior. The vehicle in-cabin device 205 may also include an infrared sensor input 240 communicatively connected to a first infrared sensor 241 and a second infrared sensor 242. While two infrared sensors 241, 242 are depicted in FIG. 2, any number of infrared sensors may be included within a vehicle interior monitoring system and may be located within a vehicle interior. The vehicle in-cabin device 205 may further include an ultrasonic sensor input 245 communicatively connected to a first ultrasonic sensor 246 and a second ultrasonic sensor 247. While two ultrasonic sensors 246, 247 are depicted in FIG. 2, any number of ultrasonic sensors may be included within a vehicle interior monitoring system and may be located within a vehicle interior. The vehicle in-cabin device 205 may also include a microphone input 250 communicatively connected to a first microphone 251 and a second microphone 252. While two microphones 251, 252 are depicted in FIG. 2, any number of microphones may be included within a vehicle interior monitoring system and may be located within a vehicle interior. The vehicle in-cabin device 205 may further include a display/user input device 225.

As one example, a first image sensor 236 may be located in a driver-side A-pillar, a second image sensor 237 may be located in a passenger-side A-pillar, a first infrared sensor 241 may be located in a driver-side B-pillar, a second infrared sensor 242 may be located in a passenger-side B-pillar, first and second ultrasonic sensors 246, 247 may be located in a center portion of a vehicle dash and first and second microphones 251, 252 may be located on a bottom portion of a vehicle interior rearview mirror. The processor 215 may acquire position data from any one of, or all of, these sensors 236, 237, 241, 242, 246, 247, 251, 252 and generate at least one 3D model (e.g., a 3D model of at least a portion of a vehicle driver) based on the position data. The processor 215 may transmit data representative of at least one 3D model to the remote computing device 210. Alternatively, the processor 215 may transmit the position data to the remote computing device 210 and the processor 255 may generate at least one 3D model based on the position data. In either event, the processor 215 or the processor 255 retrieve data representative of a 3D model of a vehicle operator and compare the data representative of the 3D model of at least a portion of the vehicle driver with data representative of at least a portion of the 3D model vehicle operator. The processor 215 and, or the processor 255 may generate a vehicle driver warning based on the comparison of the data representative of the 3D model of at least a portion of the vehicle driver with data representative of at least a portion of the 3D model vehicle operator to warn the vehicle operator that his position is indicative of inattentiveness. Alternatively, the processor 215 and/or the processor 255 may generate an advisory based on the comparison of the data representative of the 3D model of at least a portion of the vehicle driver with data representative of at least a portion of the 3D model of a vehicle operator to advise the vehicle operator how to correct her position to improve attentiveness.

The network interface 230 may be configured to facilitate communications between the vehicle in-cabin device 205 and the remote computing device 210 via any hardwired or wireless communication network 215, including for example a wireless LAN, MAN or WAN, WiFi, the Internet, or any combination thereof. Moreover, the vehicle in-cabin device 205 may be communicatively connected to the remote computing device 210 via any suitable communication system, such as via any publicly available or privately owned communication network, including those that use wireless communication structures, such as wireless communication networks, including for example, wireless LANs and WANs, satellite and cellular telephone communication systems, etc. The vehicle in-cabin device 205 may cause insurance risk related data to be stored in a remote computing device 210 memory 260 and/or a remote insurance related database 270.

The remote computing device 210 may include a memory 260 and a processor 255 for storing and executing, respectively, a module 261. The module 261, stored in the memory 260 as a set of computer-readable instructions, facilitates applications related to determining a vehicle in-cabin device location and/or collecting insurance risk related data. The module 261 may also facilitate communications between the computing device 210 and the vehicle in-cabin device 205 via a network interface 265, a remote computing device network connection 266 and the network 215 and other functions and instructions.

The computing device 210 may be communicatively coupled to an insurance related database 270. While the insurance related database 270 is shown in FIG. 2 as being communicatively coupled to the remote computing device 210, it should be understood that the insurance related database 270 may be located within separate remote servers (or any other suitable computing devices) communicatively coupled to the remote computing device 210. Optionally, portions of insurance related database 270 may be associated with memory modules that are separate from one another, such as a memory 220 of the vehicle in-cabin device 205.

Figure 3A:
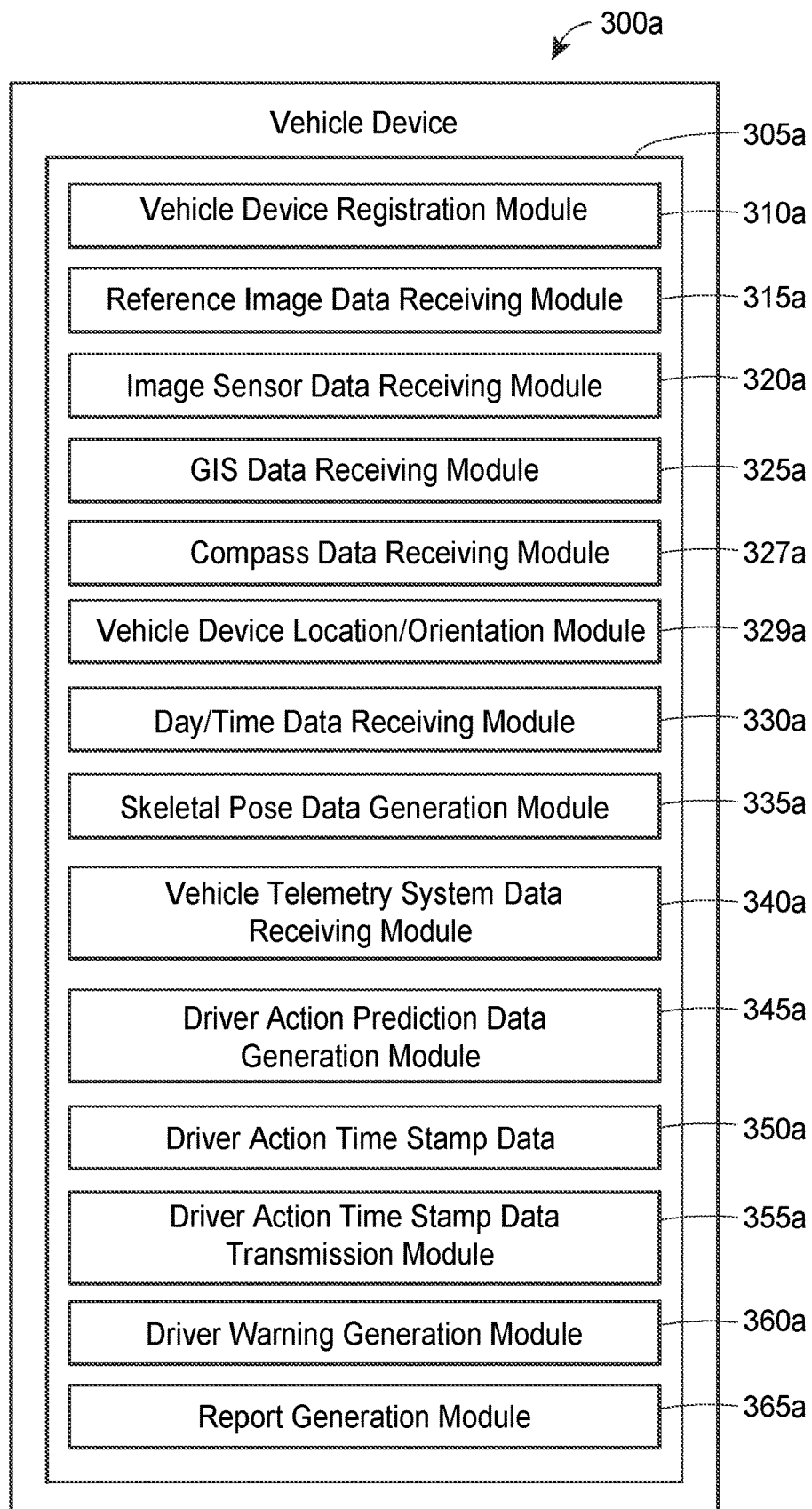
FIGS. 3A and 3B depict block diagrams of example vehicle devises for use in vehicle operator gesture recognition and transmission of related gesture data.

Turning to FIG. 3A, a vehicle device 300a is depicted. The vehicle device 300a may be similar to, for example, the vehicle device 205 of FIG. 2. The vehicle device 300a may include a vehicle device registration module 310a, a reference image data receiving module 315a, an image sensor data receiving module 320a, a geographic information system (GIS) data receiving module 325a, a compass data receiving module 327a, a vehicle device location/orientation module 329a, a day/time data receiving module 330a, a skeletal pose data generation module 335a, a vehicle telemetry system data receiving module 340a, a driver action prediction data generation module 345a, a driver action time stamp data generation module 350a, a driver action time stamp data transmission module 355a, a driver warning generation module 360a, and a report generation module 365a stored on a memory 305a as, for example, computer-readable instructions.

Figure 3B:
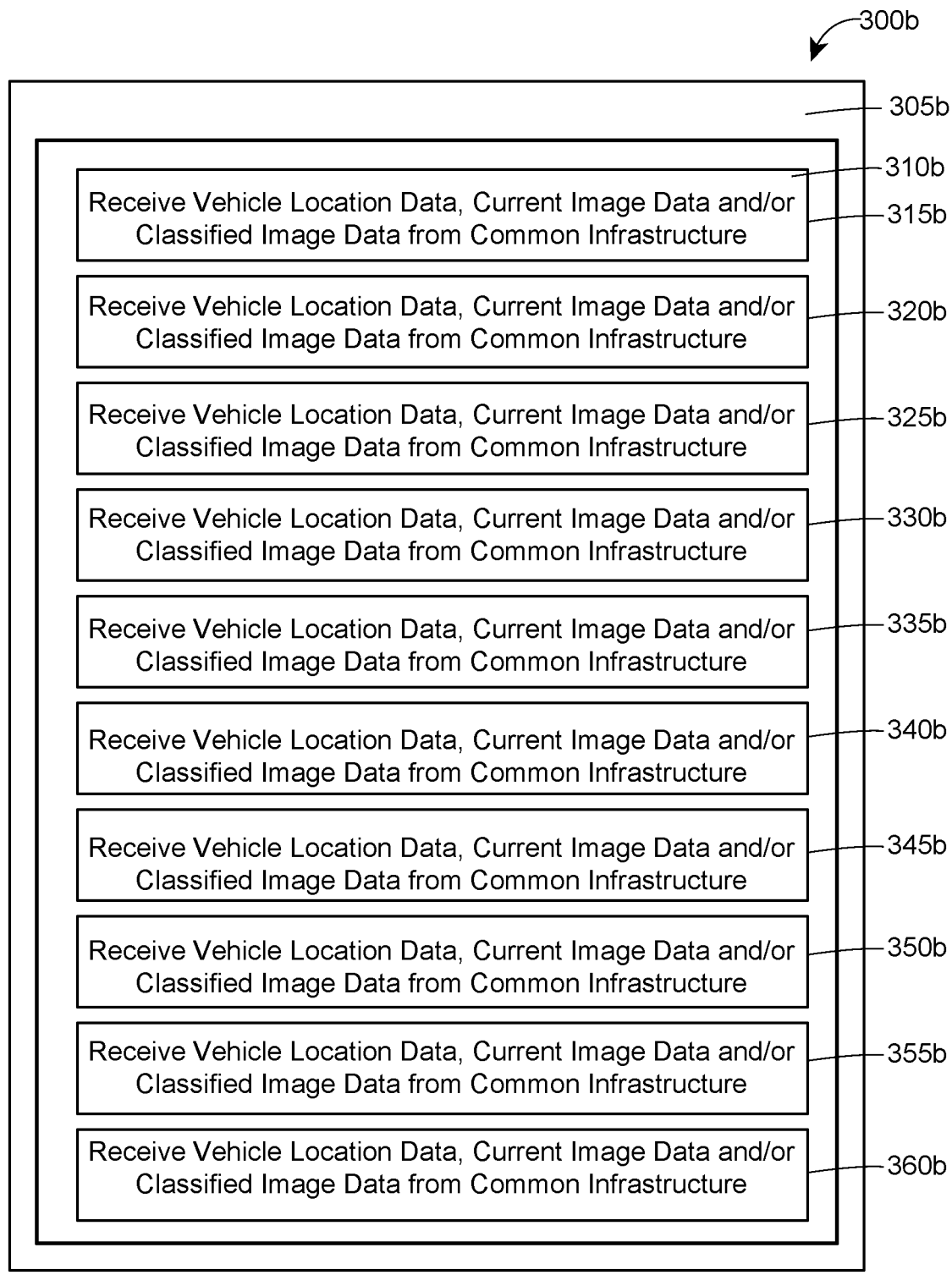

With reference to FIG. 3B, a vehicle interior imaging system 300b may include a vehicle device 305b. The vehicle device 305b may be similar to, for example, vehicle device 205 of FIG. 2. The vehicle device 305b may include a vehicle location data receiving module 315b, a previously classified image data receiving module 320b, a current image data receiving module 325b, a current image data classification module 330b, a vehicle location data, current image data and/or classified image data to at least one individual transmission module 335b, a vehicle location data, current image data and/or classified image data to common infrastructure transmission module 340b, a vehicle location data, current image data and/or classified image data from at least one individual receiving module 345b, a vehicle location data, current image data and/or classified image data from at least one other vehicle receiving module 350b, and a vehicle location data, current image data and/or classified image data from common infrastructure receiving module 360b stored on a memory 310b as, for example, computer-readable instructions.

Figure 4:
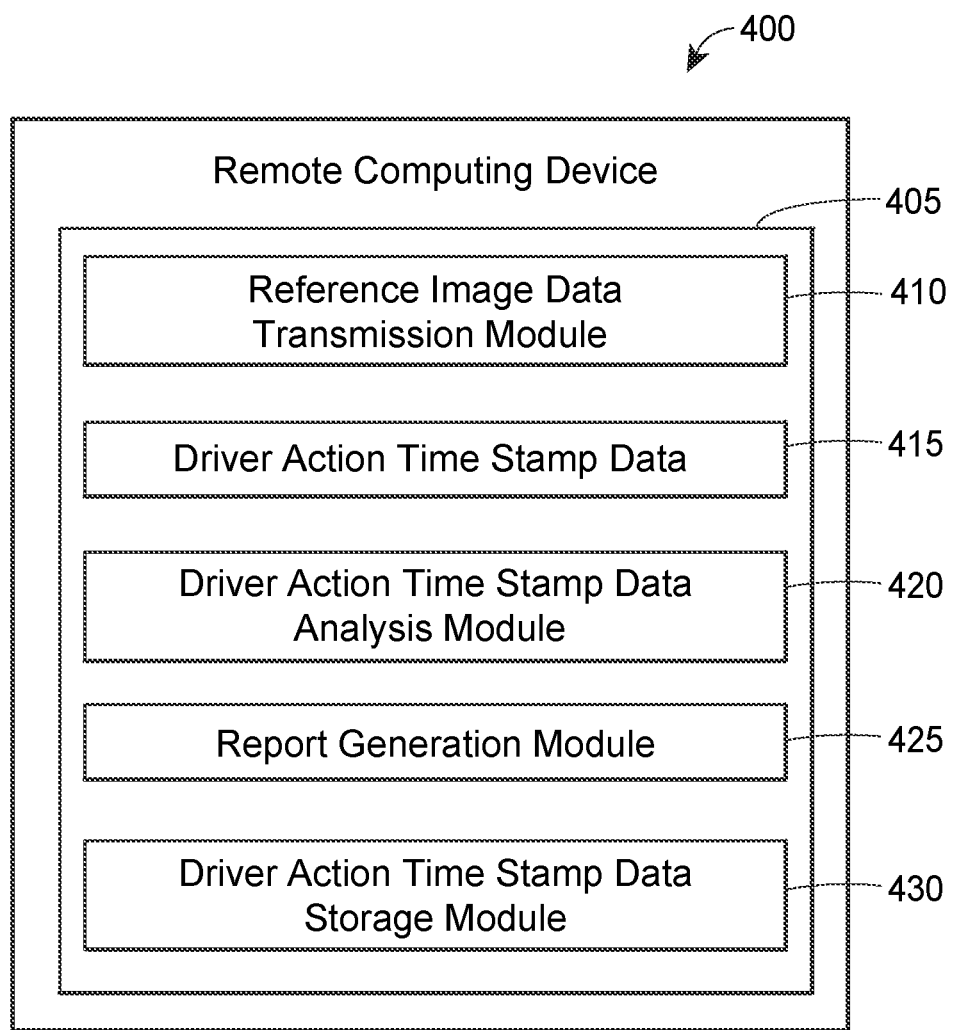
FIG. 4 depicts a block diagram of an example remote computing device for use in generating data representative of vehicle in-cabin insurance risk evaluations.

Turning to FIG. 4 a remote computing device 400 is depicted. The remote computing device 400 may be similar to the remote computing device 210 of FIG. 2. The remote computing device 400 may include a reference image data transmission module 410, a driver action time stamp data receiving module 415, a driver action time stamp data analysis module 420, a report generation module 425, and a driver action time stamp data storage module 430 stored on a memory 405.

Figure 5A:
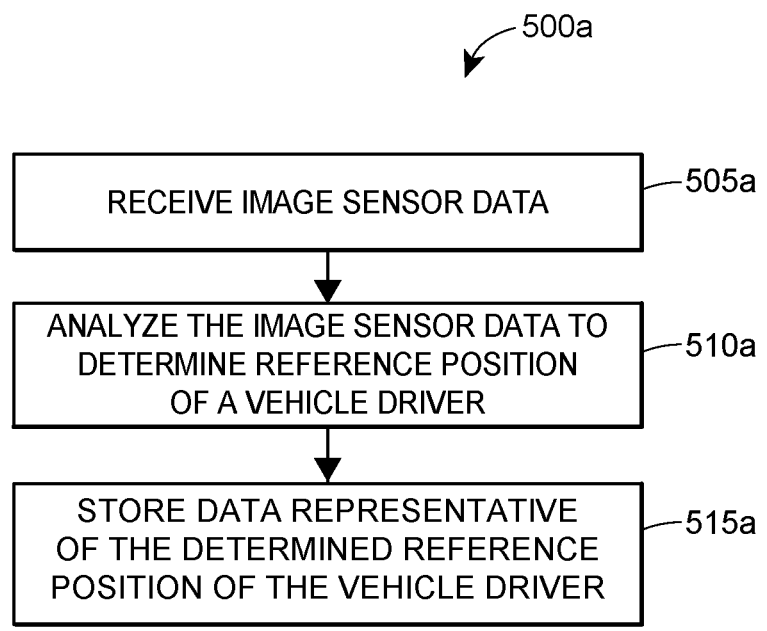
FIGS. 5A and 5B depict flow diagrams for example methods of vehicle operator gesture recognition and transmission of related gesture data.

With reference to FIG. 5A, a flow diagram for an example method of registering a vehicle device (e.g., vehicle device 205, 300a, 305b) within a vehicle 500a is depicted. The method 500a may be implemented by a processor (e.g., processor 225) executing, for example, a portion of the modules 310a-365a of FIG. 3A. In particular, the processor 225 may execute a vehicle device registration module 310a and a reference image data receiving module 315a to cause the processor 225 to acquire image data from, for example, an image sensor (e.g., image sensor 265, 270 of FIG. 2) (block 505a). The processor 225 may further execute the vehicle device registration module 310a to cause the processor 225 to analyze the image sensor data to determine reference position of the vehicle device 205, 300a, 300b (block 510a). The processor 225 may further execute the vehicle device registration module 310a to cause the processor 225 to store data representative of the determined reference position of the vehicle driver (block 515a). The method 500a may be implemented, for example, in response to a driver of a vehicle placing a vehicle device 205, 300a, 300b within an associated vehicle (e.g., a driver may place the vehicle device 205, 300a, 300b on a dash of the vehicle near a passenger side A-pillar). Thereby, a generic vehicle module 205, 300a, 300b may be installed by a vehicle driver in any vehicle.

Vehicle driver postures may be rotated and scaled to be standardized (or normalized) vehicle device 205, 300a, 300b locations within a vehicle and standardized (or normalized) to an average human (i.e., applicable to all drivers). Subsequent to being registered within a given vehicle, a vehicle device 205, 300a, 300b may use image sensors 265, 270 to detect driver movements and record/categorize distinct driver postures (e.g., skeletal diagrams 125, 150, 155, 160, 165, 170. The methods and systems of the present disclosure may present results in two ways: 1) via detailed report of different postures; and 2) via graphical representation of the postures detected with timeframe (e.g., as in report 100 of FIG. 1).

Figure 5B:
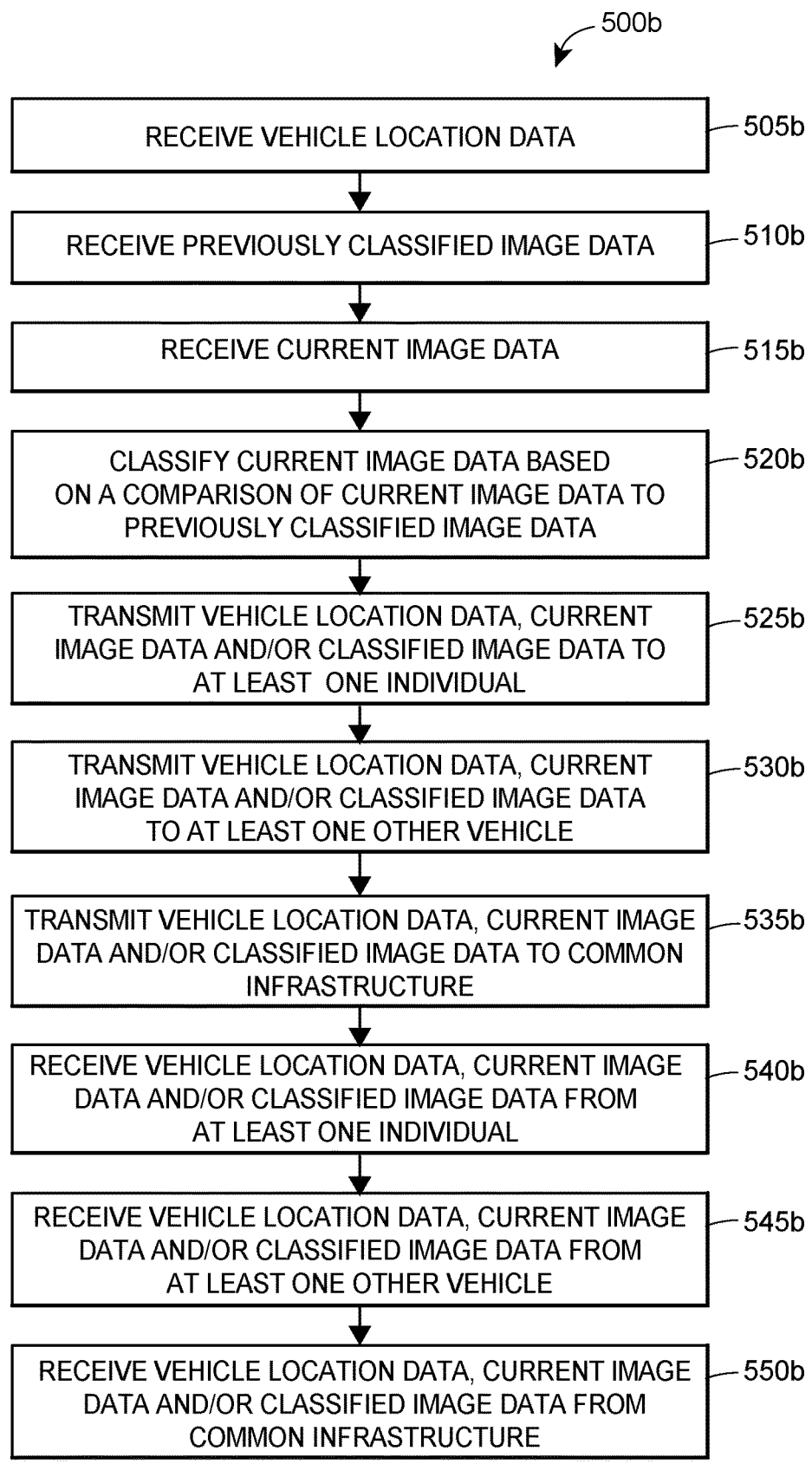

With reference to FIG. 5B, a flow diagram for an example method of vehicle operator gesture recognition and transmission of related gesture data 500b is depicted. The method 500b may be implemented by a processor (e.g., processor 225) executing, for example, at least a portion of the modules 315b-360b of FIG. 3B. In particular, the processor 225 may execute a vehicle location data receiving module 315b to, for example, cause the processor 225 to receive vehicle location data (block 505b). The processor 225 may receive vehicle location data from, for example, a global positioning system sensor (e.g., GPS sensor 329). The vehicle location data may be representative of, for example, a geographic position of an associated vehicle. Alternatively, or additionally, the vehicle location data may be representative of vehicle headings, vehicle longitudinal/lateral accelerations, degree of vehicle braking, vehicle cornering forces, etc. (i.e., collectively referred to as "vehicle dynamics").

The processor 225 may execute a previously classified image data receiving module 320b to cause the processor 225 to, for example, receive previously classified image data (block 510b). The previously classified image data may be, for example, representative of images and/or extracted image features that have been previously classified as being indicative of degrees of vehicle operator risk. More particularly, the previously classified image data may include images and/or extracted image features that have previously been classified as being representative of a vehicle operator using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, etc. Alternatively, or additionally, the previously classified image data may, for example, be representative of known vehicle occupant locations/orientations, known cellular telephone locations/orientations, known vehicle occupant eye locations/orientations, known vehicle occupant head location/orientation, known vehicle occupant hand location/orientation, a known vehicle occupant torso location/orientation, a known seat belt location, a known vehicle seat location/orientation, etc.

The processor 225 may execute a current image data receiving module 325b to cause the processor 225 to, for example, receive current image data (block 515b). For example, the processor 225 may receive current image data from at least one vehicle sensor (e.g., at least one of a compass sensor 327, a GPS sensor 329, an image sensor 336, 337, an infrared sensor 341, 342, an ultrasonic sensor 346, 347, and/or a microphone 351, 352). The current image data may include images and/or extracted image features that are representative of a vehicle occupant using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, etc. Alternatively, or additionally, the current image data may, for example, be representative of vehicle occupant locations/orientations, cellular telephone locations/orientations, vehicle occupant eye locations/orientations, vehicle occupant head location/orientation, vehicle occupant hand location/orientation, a vehicle occupant torso location/orientation, a seat belt location, a vehicle seat location/orientation, etc.

The processor 225 may execute a current image data classification module 330b to, for example, cause the processor 225 to classify the current image data (block 520b). For example, the processor 225 may classify the current image data by comparing the current image data to previously classified image data. Alternatively, the processor 225 may extract features from the current image data, and may compare the features that are extracted from the current image data to features extracted from previously classified image data. The classified image data may be representative of, for example, distractions associated with a driving route, a vehicle driver rating, a vehicle occupant posture, transitioning between autonomous and manual modes of vehicle operation, whether a vehicle is being operated in an autonomous mode or a manual mode, vehicle operator distractions, whether a vehicle system is distracting to a vehicle operator, a degree of risk associated with a vehicle operator, various actions of a vehicle operator, a vehicle operation log, whether a vehicle is being driven into a rising or setting sun, vehicle operator near collision misses, whether a vehicle operator is texting while driving, whether a vehicle operator is using a mobile telephone while driving, a driving environment of a vehicle operator based on vehicle occupant actions, vehicle operator distractions at particular geographic locations, instances in which a vehicle operator are unfit to operate a vehicle, vehicle occupant actions, a notification that a vehicle operator is unfit to operate an associated vehicle, a vehicle operator's emotions, etc., as described in detail in, for example, the above U.S. Patent Applications that have been incorporated by reference.

The processor 225 may execute a vehicle location data, current image data and/or classified image data transmission module 335b to, for example, cause the processor 225 to transmit vehicle location data, current image data and/or classified image data to at least one individual (e.g., a vehicle operator, a pedestrian, bicyclists, a law enforcement, etc.) (block 525). The processor 225 may execute a vehicle location data, current image data and/or classified image data transmission module 340b to, for example, cause the processor 225 to transmit vehicle location data, current image data and/or classified image data to at least one other vehicle (block 530). The processor 225 may execute a vehicle location data, current image data and/or classified image data receiving module 345b to, for example, cause the processor 225 to transmit vehicle location data, current image data and/or classified image data to common infrastructure (e.g., roadside equipment (RSE), a remote server, a law enforcement server, an insurance company server, etc.) (block 535).

The processor 225 may execute a vehicle location data, current image data and/or classified image data receiving module 350b to, for example, cause the processor 225 to receive vehicle location data, current image data and/or classified image data from at least one individual (block 540). The processor 225 may execute a vehicle location data, current image data and/or classified image data receiving module 340b to, for example, cause the processor 225 to receive vehicle location data, current image data and/or classified image data from at least one other vehicle (block 545). The processor 225 may execute a vehicle location data, current image data and/or classified image data module 345b to, for example, cause the processor 225 to receive vehicle location data, current image data and/or classified image data from common infrastructure (e.g., roadside equipment (RSE), a remote server, a law enforcement server, etc.) (block 550).

Collective processors may determine that a risk of a crash has exceeded an acceptable threshold (or that a crash is imminent). A probability of a crash occurring may be determined by analyzing a current state of one or more drivers, dynamics and/or trajectories of one or more vehicles, locations of one or more RSE's, locations of one or more infrastructure fixtures, and/or locations and/or trajectories of one or more road users (e.g., pedestrians). A magnitude of a probable crash may be determined by analyzing a current state of one or more drivers, dynamics and/or trajectories of one or more vehicles, speeds of one or more vehicles, acceleration (or deceleration) of one or more vehicles, locations of one or more RSE's, locations of one or more infrastructure fixtures, and/or locations and trajectories of one or more road users (e.g., pedestrians). A warning may be transmitted to one or more drivers or one or more road users in order to prevent the crash.

Collective processors may determine that there are multiple vehicles with risk scores that exceed a given threshold and/or that there are multiple vehicles with driver states that are classified as potentially hazardous. The collective processors may determine that the vehicles with risk scores that exceed the threshold are within a given proximity of each other (and at least one RSE). A group of distracted vehicles may be determined to be a cluster. The cluster may consist of a changing number of vehicles, depending on the risk score and proximities in real-time. A vehicle in a distracted cluster may be Vehicle A, the network may analyze locations and headings of other vehicles, nearby the cluster of distracted vehicles. If the nearby vehicles are on a trajectory, or a route, a network onboard an approaching vehicle may reroute or redirect the driver of vehicle B (e.g., finding alternative routes, pathways, turns, etc.—away from the distracted cluster). Alternatively, or additionally, the driver of Vehicle B may elect to set this re-routing to automatic, selection-only, or deactivate completely.

Warnings may be transmitted to vulnerable (non-vehicular) road users to avoid distracted clusters, such as bicyclists, pedestrians, cars broken down on the side of the road. A system may detect driver movements within a vehicle (e.g., driver head pose, hand motions, body posture, etc.).

A degree of driver risk may be determined using, for example, a probability function where each term may be a weighted factor derived from image data, and may include images and/or extracted image features that are representative of a vehicle operator using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, vehicle occupant locations/orientations, cellular telephone locations/orientations, vehicle occupant eye locations/orientations, vehicle occupant head location/orientation, vehicle occupant hand location/orientation, a vehicle occupant torso location/orientation, a seat belt location, a vehicle seat location/orientation, etc. As a specific example, if the current image data is representative of a vehicle operator using a cellular phone and looking out a side window, the resulting risk will be higher than when the current image data is representative of the vehicle operator only looking out the side window, and not using a cellular phone. Any given vehicle operator activity may be weighted individually based upon, for example, a likelihood that the particular vehicle operator activity would cause property and/or personal damage.

Systems and methods of the present disclosure may include detecting, transmitting, and categorizing in aggregate. There may be times when the system encounters previously-unclassified behaviors. For example, a device may detect driver movements from the current image data. The device may attempt to classify the current image data to previously-classified image data. Based on the uniqueness of the current image data, the device may determine that the probability of a match to a known behavior is below an acceptable threshold. The system onboard the individual device may create a sample of the 3D or 2D image data and stores on the device storage medium. When the behavior logs are uploaded to an external server, the sample image data of the unique behavior may be uploaded. Thereby, at a central data repository, a sample of a unique behavior may be collected along with other samples of unique behaviors (sent from other individual systems). From the collection of samples, pattern recognition algorithms may be applied in order to categorize the previously-uncategorized behaviors. As new categories are developed, these new classifications may be sent to update other devices in the field so that their classification systems may be even more robust for all the possible behaviors that may occur.

Figure 6:
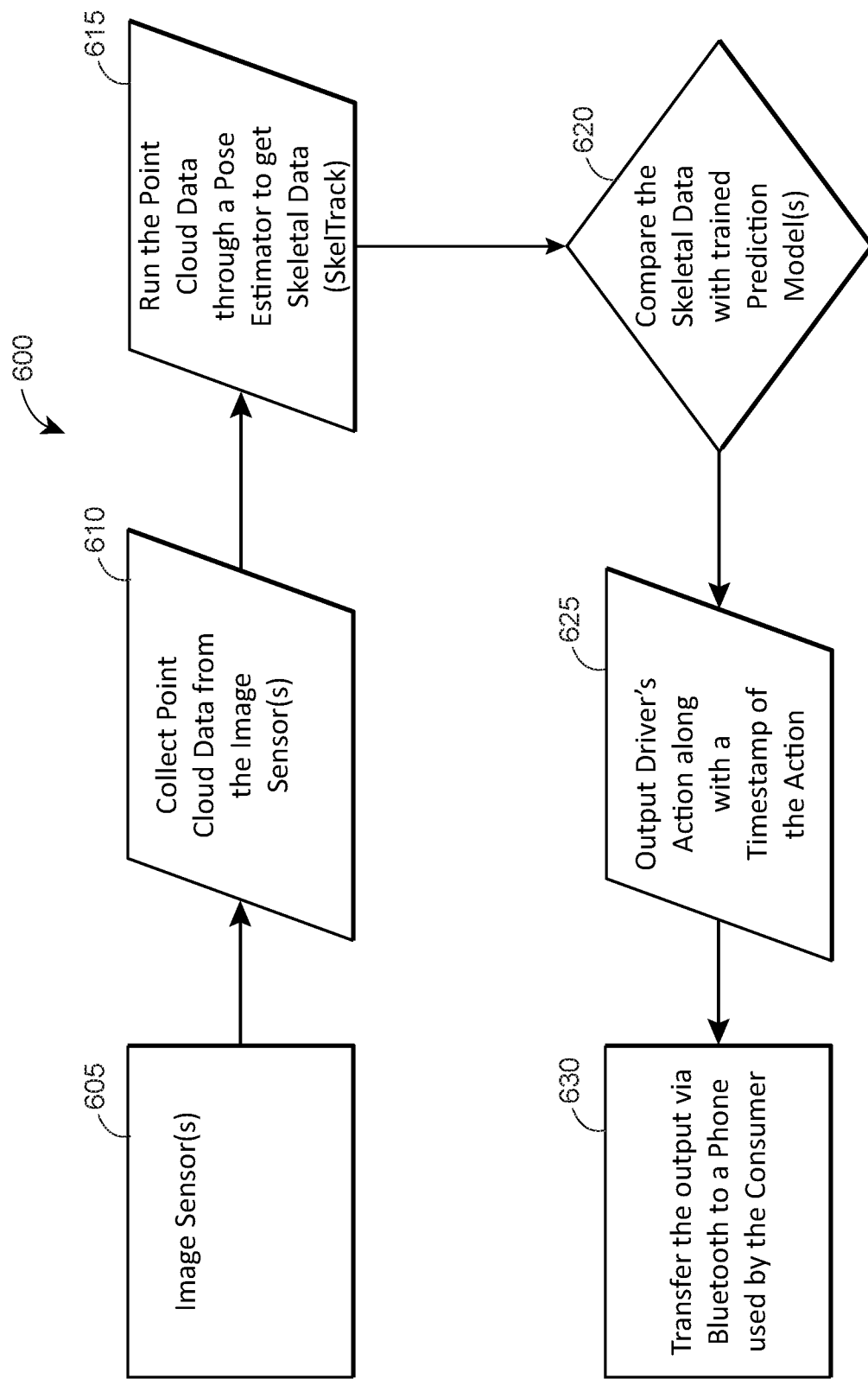
FIG. 6 depicts a flow diagram for an example method of generating data representative of a vehicle driver's actions along with an associated time stamp.

Turning to FIG. 6, a flow diagram of a method of generating data representative of a driver's action along with data representative of a time stamp 600 is depicted. The method 600 may be implemented by a processor (e.g., processor 225 of FIG. 2) executing, for example, at least a portion of the modules 310-365 of FIG. 3. In particular, the processor 225 may execute an image sensor data receiving module 320 to cause the processor 225 to receive image sensor data from an image sensor (e.g., image sensor 265, 270 of FIG. 2) (block 605). The processor 225 may further execute the image sensor data receiving module 320 to cause the processor 225 to receive point cloud data from an image sensor (e.g., image sensor 265, 270 of FIG. 2) (block 610). The processor 225 may execute a skeletal pose data generation module 335 to cause the processor 225 to process the point cloud data through, for example, a pose estimator to generate skeletal diagram data (block 615). The processor 225 may execute a reference image data receiving module 315 to cause the processor 225 to receive data representative of trained prediction modules (block 620). The processor 225 may execute a driver action prediction data generation module 345 to cause the processor 225 to compare the skeletal diagram data with the trained prediction models (block 620). The processor 225 may execute a day/time data receiving module 330 to cause the processor 225 to receive data representative of a day and/or time associated with a particular drive day/time (block 625) The processor 225 may execute a driver action time stamp data generation module 350 to cause the processor 225 to generate data representative of driver actions along with a timestamp of the action based on the driver action data generated in block 620 and further based on the data representative of the day/time (block 625). The processor 225 may execute a driver action time stamp data transmission module 360 to cause the processor 225 to transfer the driver action time stamp data to, for example, a driver's cellular telephone via, for example, a Bluetooth communication (e.g., wireless transceiver 275 of FIG. 2). The method 600 may use skeleton tracking and face tracking technologies to identify different driver postures. Driver joints data points (e.g., joints data points 1806-1813 of FIG. 18) may be clustered to create entries which represent a unique driver posture. These postures may then be used for making predictions about the subject's driving habits.

A determination of a degree of risk may include a comparison of data associated with a current image with previously-classified image data. Additional factors may be taken into account in determining a degree of risk. For example, a risk of a specific behavior (e.g., texting) may evolve from identifying that the driver is currently texting and correlating that to known images of texting. Once it's known that the driver is texting, there may be different risks associated with different manifestations of that broad category of behavior.

A degree of risk for a category of behavior may depend on context. For example, other sensor inputs, aside from image data, and processing the information from at least one of those inputs (if available) may be included. However, additional inputs are not required in order to make a degree of risk determination.

Contextual factors that may form part of a degree of risk determination may include: 1) a current behavior in context of current and previous vehicle dynamics from a particular trip (e.g., variables such as lateral/longitudinal acceleration (acceleration, braking, cornering), speed, steering inputs, smooth or erratic trajectory, different risks associated with texting while in a middle of a left turn, etc.); 2) current behavior in context of current and previous locations from the particular trip; 3) current behavior in context of presence, relative distances and bearings of pedestrians near the vehicle as noted by vehicle sensors, or communications with an external database; 4) current behavior in context of previous behaviors from the particular trip (e.g., consider a risk of typing on your phone at 12:05 given information that you typed on your phone at 12:01 and 12:03, compare the degree of risk here to only typing at 12:01, one may indicate a conversation, the other may indicate a one-time message); 5) current behavior in context of known weather, road surface, or traffic conditions—this information may be provided from sensors on an associated vehicle device, vehicle sensors and/or communications from external databases; and 6) current behavior in context of roadway infrastructure type. A roadway infrastructure type may be, for example, measured directly or deduced from location and vehicle dynamics. For example, a risk of texting while on a straight part of highway may be different than a risk of texting while merging on a highway on-ramp. Consideration of current behaviors in context of factors noted above may be how the system reaches a determination of a degree of risk for the current behavior. This may start with a broad category of behavior (e.g., texting) and make a more precise risk determination based on contextual factors.

Figure 7:
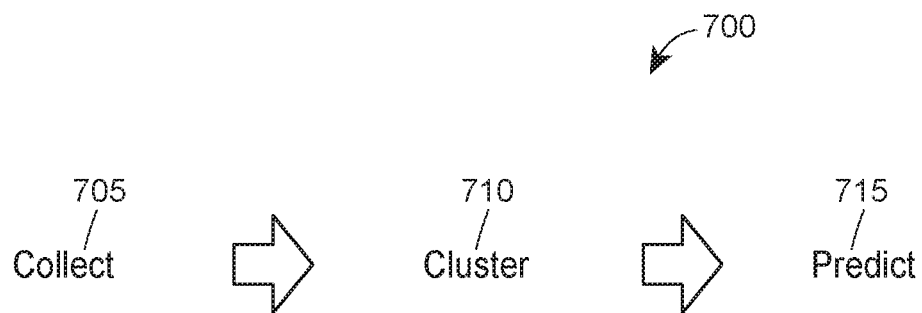
FIG. 7 depicts a flow diagram for an example method of generating data representative of a prediction of a vehicle driver's action.

With reference to FIG. 7, and for prototype purposes, the system may implement a method to make predictions for a single driver 700. The method 700 may be implemented by a processor (e.g., processor 225 of FIG. 2) executing, for example, a portion of the modules 310-365 of FIG. 3. In particular, the processor 225 may execute an image sensor data receiving module 320 to cause the processor 225 to collect image data (block 705). The processor 225 may execute a skeletal pose data generation module 335 to cause the processor 225 to generate cluster data (block 710). The processor 225 may execute a driver action prediction data generation module 345 to predict driver's actions (block 715).

Turning to FIG. 8, a flow diagram for an example method of registering (or training) a vehicle device (e.g., vehicle device 205, 300) in a vehicle 800. The method may be implemented by a processor (e.g., processor 225 of FIG. 2) executing, for example, at least a portion of the modules 310-365 of FIG. 3. The method 800 may include receiving data points for a driver's skeletal diagram (block 805), initiating sensors and related programs (block 810), setting a sensor range to "near mode" (block 815), setting positioning to a "seated mode" (block 820), and instructing a driver on proper position for calibration (block 825) (e.g., driver should lean forward or move their hands/body (block 826)). The method 800 may also include polling the sensors (e.g., image sensors 265, 270) for driver initial position (block 830) and obtaining ten tracked points (e.g., points 1806-1813 of FIG. 18) (block 835). The method may further include instructing a driver to move to a normal seated position (block 840) and storing vehicle device registration data (block 845).

With reference to FIG. 9, a flow diagram for a method categorizing various driver's joints points (e.g., points 1806-1813 of FIG. 18) 900 is depicted. The method 900 may include registering initial data points of a driver's skeleton diagram (block 905), saving all ten triplets associated with a driver's skeleton diagram and associated timestamp (block 910), finding nearest points for each point (block 915) (e.g., select nearest two vertical and nearest two horizontal points (block 916)). The method 900 may also include categorizing the highest points as a drivers head (e.g., point 1807 of FIG. 18) (block 920), categorizing the lowest two points as the driver's hands (e.g., points 1811, 1813 of FIG. 18) (block 925), and storing the categorized points (block 930).

Figure 10:
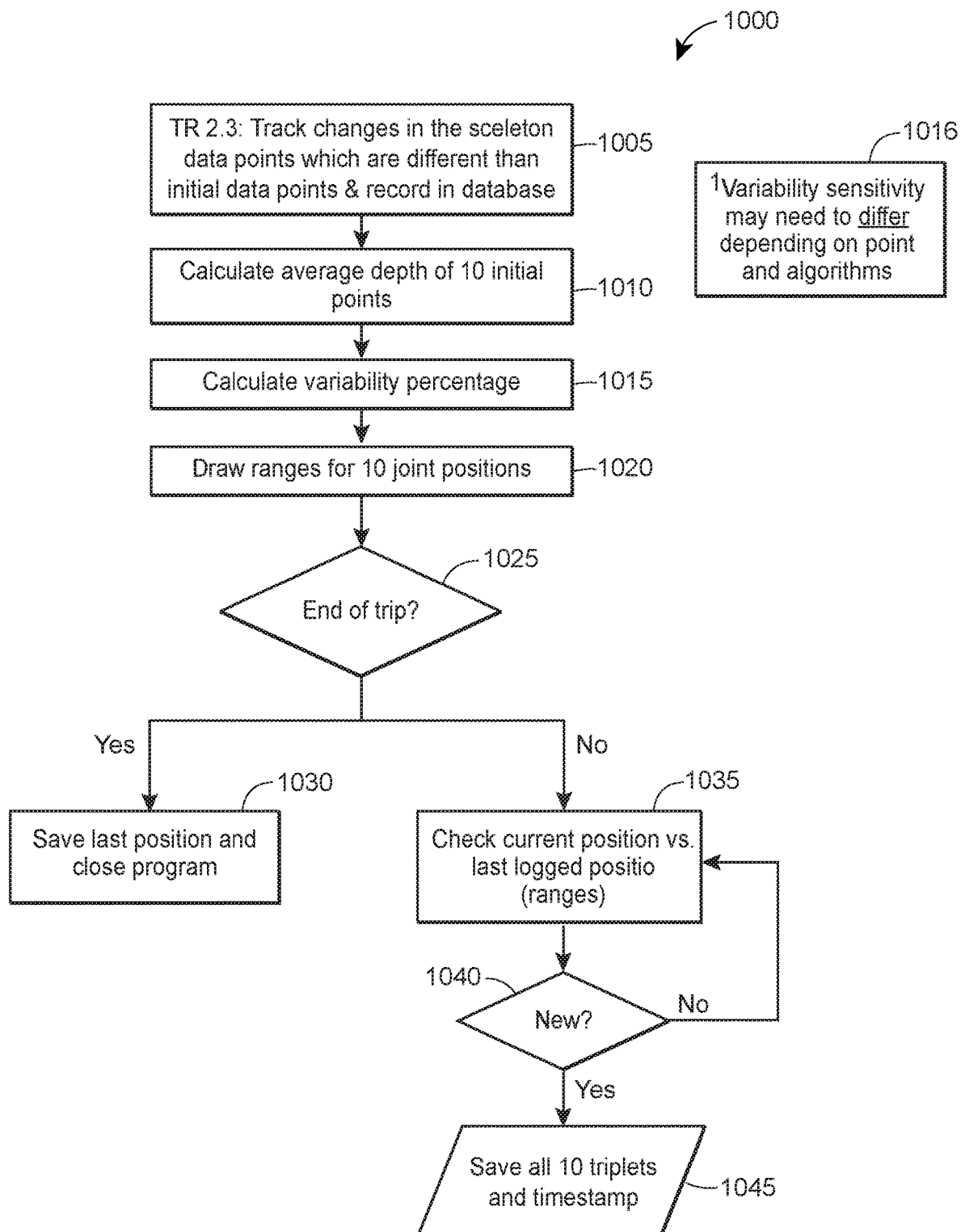

Turning to FIG. 10, a flow diagram for an example method of predicting driver actions 1000 is depicted. The method 1000 may include tracking changes in the skeleton data points which are different than initial data points and record the changes in a database (block 1005), calculating average depth of ten initial points (block 1010), calculating variability percentage (block 1015) (e.g., variability sensitivity may differ depending on point and algorithms (block 1016)), draw ranges for ten joint positions (block 1020), and determine if an trip ended (block 1025). If the trip is determined to have ended (block 1025), the method includes saving the last position and ending the method 1000 (block 1030). If the trip is determined to not have ended (block 1025), the method 1000 checks a driver's current position vs. last logged position (range) (block 1035), and determines whether the driver's current position is new (block 1040). If the driver's current position is determined to be new (block 1040), the method 1000 saves all ten triplets and timestamps the triplets (block 1045), and then returns to block 1020. If the driver's current position is determined to not be new (block 1040), the method 1000 returns to block 1035.

BR1 and TR1.1, 1.2 and 1.3 may be used to identify a new driver (e.g., an algorithm for recognizing the driver being a new driver). The system may use the detailed algorithm mentioned as described in FIGS. 8-10. BR2 and TR2.1, 2.2 and 2.3 may be used to track movement of driver's upper body (e.g., an algorithm for tracking the movement of the driver's upper body is detailed in FIGS. 8-10). BR3 and TR3.1, 3.2 and 3.3 may be used to log driver's clearly distinct postures at different times (e.g., an algorithm is to identify and log distinct postures from the movements tracked as part of BR2). The methods and systems of the present disclosure may be implemented using C++. Associated application programming interfaces (APIs) and software development kits (SDKs) may support these platforms. Source code for the system may be controlled with, for example, versioning software available from Tortoise SVN.

Figure 11:
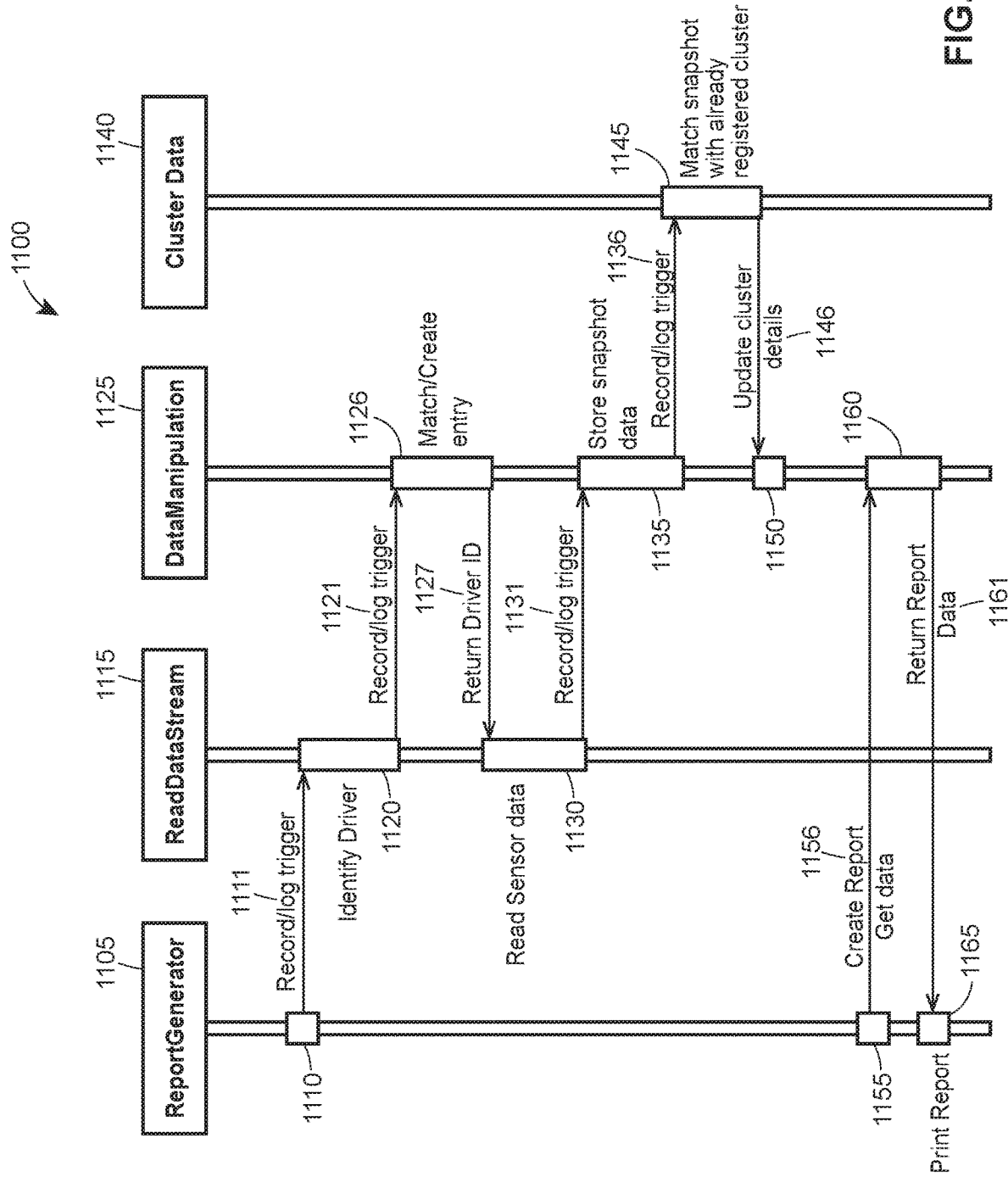
FIG. 11 depicts an example sequence diagram for generating a report for a vehicle in-cabin insurance risk evaluation.

With reference to FIG. 11, a sequence diagram for generating a vehicle in-cabin insurance risk evaluation report 1100 is depicted. A report generator 1105 may record/log a trigger 1111 at instance 1110. A data stream reader 1115 may identify a driver 1120 and record/log a trigger 1121. A data manipulation 1125 may match/create and entry 1126 and return a driver ID 1127. The data stream reader 1115 may read image sensor data 1130 and record/log a trigger 1131. The data manipulation 1125 may store snapshot data 1135 and record/log a trigger 1136. Cluster data 1140 may match a snapshot with an already registered cluster 1145 and may update cluster details 1146 at instance 1150. The report generator 1105 may get data and create a report 1156 at instance 1155. The data manipulation 1125 may return report data 1161 at instance 1160, and the report generator 1105 may print the report 1165.

Figure 12:
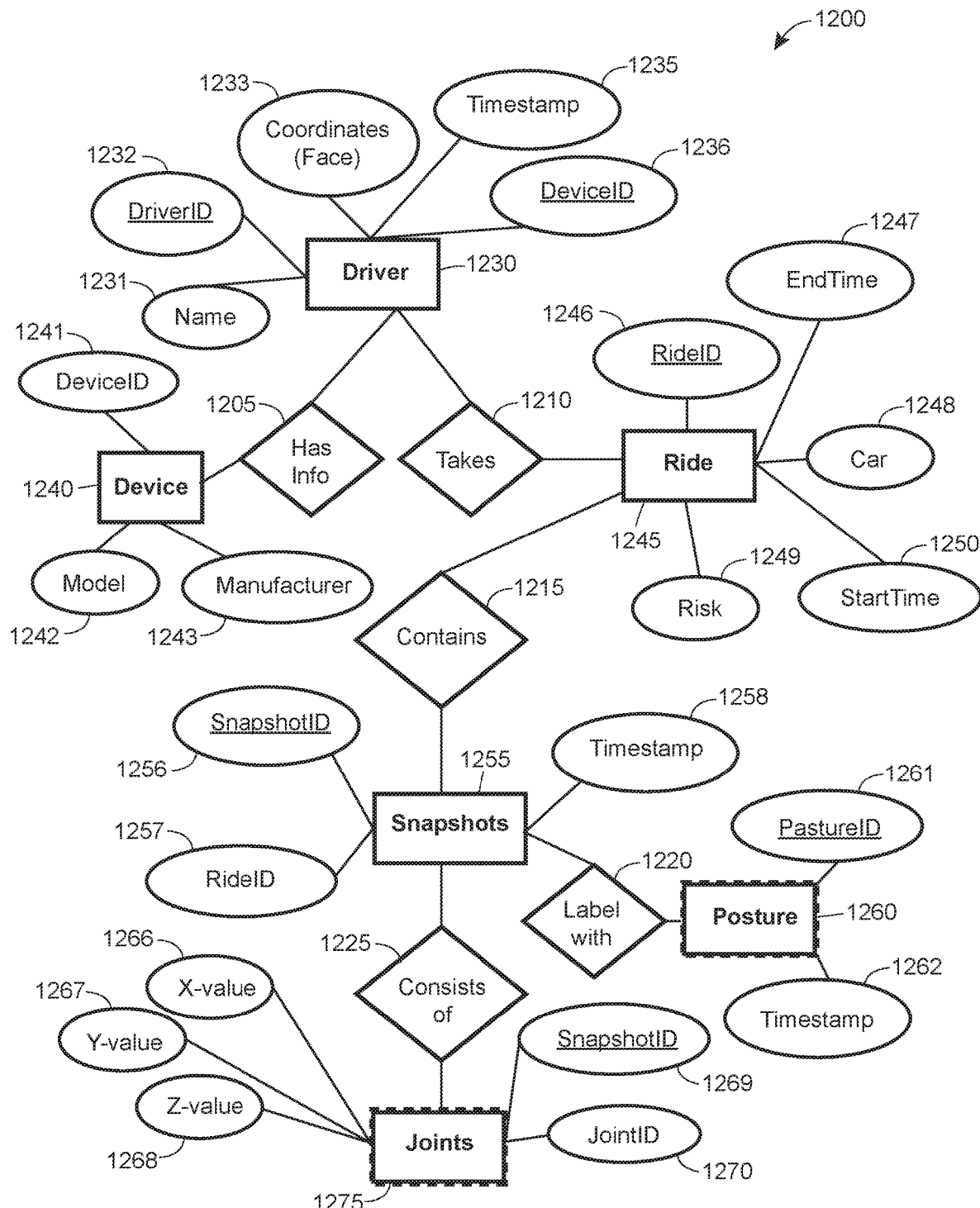
FIG. 12 depicts a detailed example E-R diagram for generating data representative of a vehicle driver's actions along with an associated time stamp.

Turning to FIG. 12, a detailed entity relationship (E-R) diagram 1200 is depicted. As depicted in FIG. 12, a driver 1230 and a device 1240 may be connected to a has info block 1205. The driver 1230 may be connected to a name 1231, a driver ID 1232, position coordinates 1233 (e.g., a face), a time stamp 1235, and a device ID 1236. The Device may be connected to a device ID 1241, a model 1242, and a manufacturer 1243. The driver 1230 and a ride 1245 may be connected to a takes block 1210. The ride 1245 may be connected to a ride ID 1246, an end time 1247, a vehicle 1248 (e.g., a car), a risk 1249, and a start time 1250. The ride 1245 and snapshots 1255 may be connected to a contains block 1215. The snapshots 1255 may be connected to a snapshots ID 1256, a ride ID 1257, and a time stamp 1258. The snapshots 1255 and a posture 1260 may be connected to a label with block 1220. The posture 126 may be connected to a posture ID 1261 and a time stamp 1262. The snapshots 1255 and joints 1275 may be connected to a consists of block 1225. The joints 1275 may be connected to a x-value 1266, a y-value 1267, a z-value 1268, a snapshot ID 1269, and a joint ID 1270.

Figure 13A:
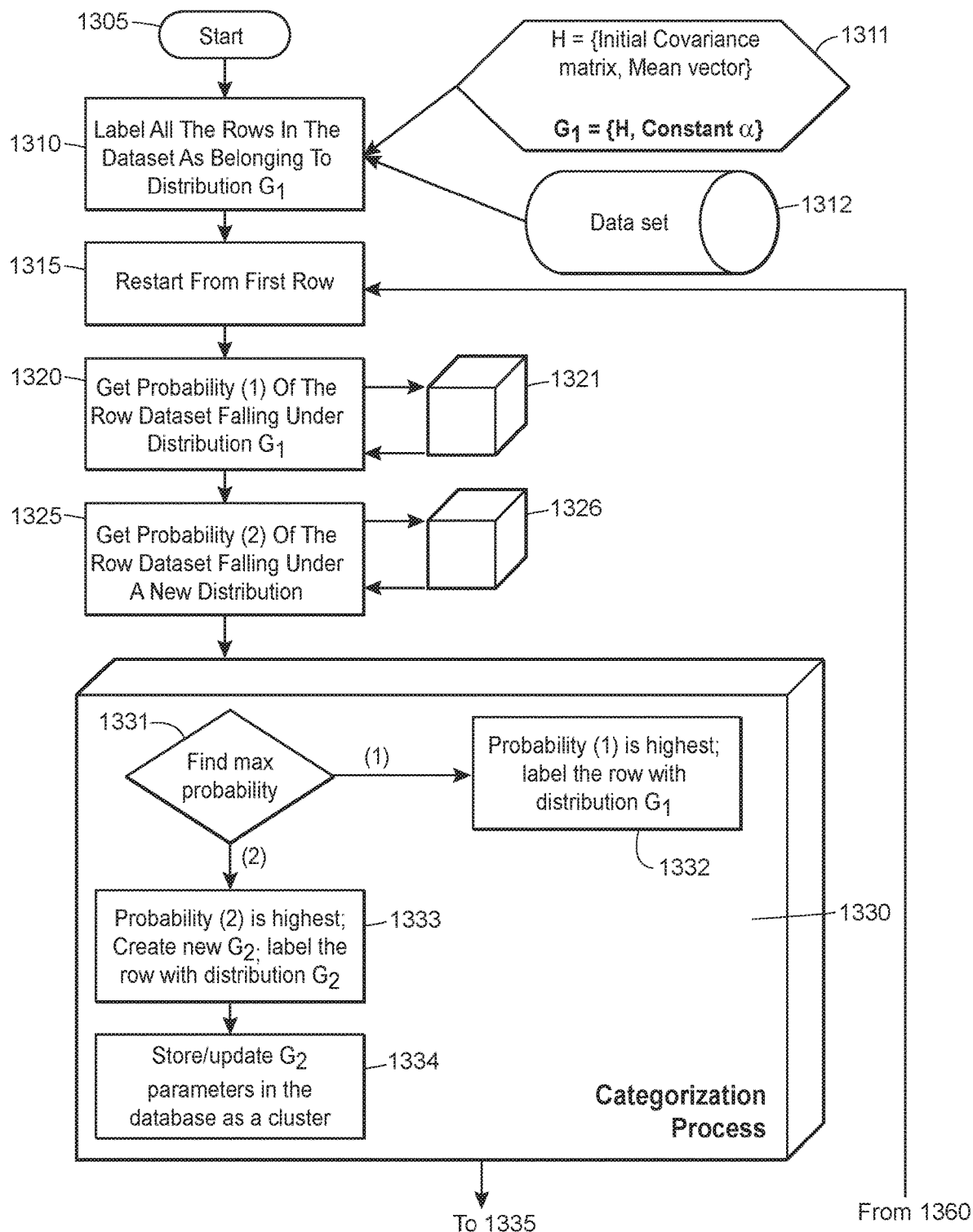
FIGS. 13A and 13B depict a flow diagram for an example method of a development environment for generating data representative of vehicle in-cabin insurance risk evaluations.
Figure 13B:
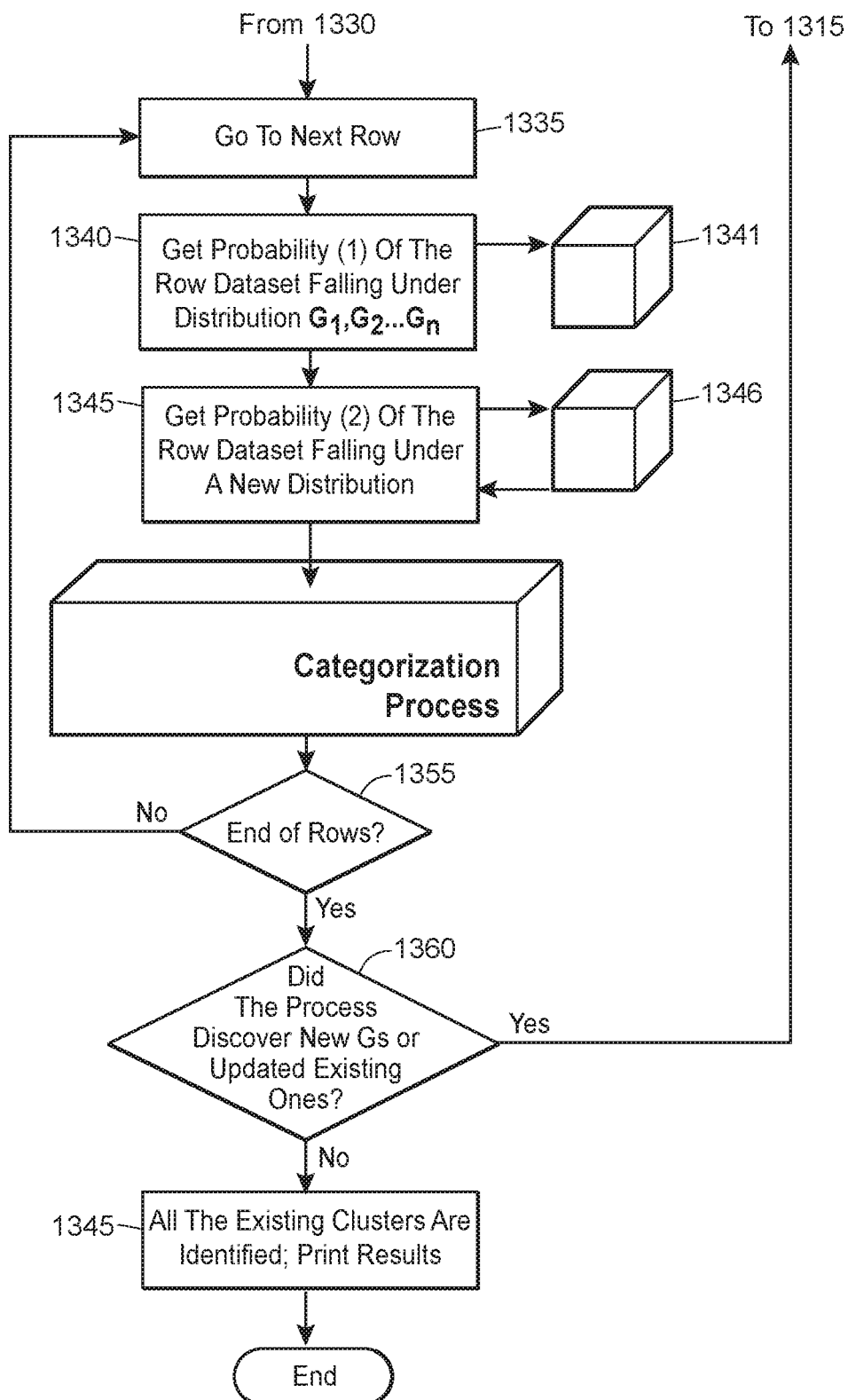

With reference to FIG. 13, a method for creating a read-only database account 1300 is depicted. A database layer 1300 may be developed in MySQL server. The method 1300 may start (block 1305). All the rows in the database may be labeled as belonging to distribution $G_1$ (block 1310). The database creation 1300 may restart from a first row (block 1315). A probability that the row (1) dataset falls under distribution $G_1$ is obtained (blocks 1320, 1321). A probability that the row (2) dataset falls under distribution $G_1$ is obtained (blocks 1325, 1326). A categorization process 1330 may include finding a maximum probability 1331. If a probability that the row (1) is found to be highest (block 1330), the row is labeled with distribution $G_1$ (block 1332). If a probability that the row (2) is found to be highest (block 1330), a new $G_2$ is created and the row is labeled with distribution $G_2$ (block 1333) and the updated $G_2$ and associated parameters are stored in the database as a cluster (block 1334). The method 1300 proceeds to the next row in the database (block 1335). A probability that the row (1) dataset falls under distribution $G_1, G_2, \ldots G_n$ is obtained (blocks 1340, 1341). A probability that the row (2) dataset falls under a new distribution is obtained (blocks 1345, 1346). A categorization process 1350 may be similar to the categorization process 1330. A determination as to whether the current row is the end of the database is made (block 1355). If the current row is determined to not be the last row (block 1355), the method 1300 returns to block 1335. If the current row is determined to be the last row (block 1355), the method 1300 proceeds to determine if the process discovered a new $G_s$ or updated existing ones (block 1360). If the process is determined to have discovered a new $G_s$ or updated existing ones (block 1360), the method 1300 returns to block 1315. If the process is determined to not have discovered a new $G_s$ or updated existing ones (block 1360), all the existing clusters may be identified and results may be printed (block 1365) and the method 1300 ends (block 1370).

Figure 14:
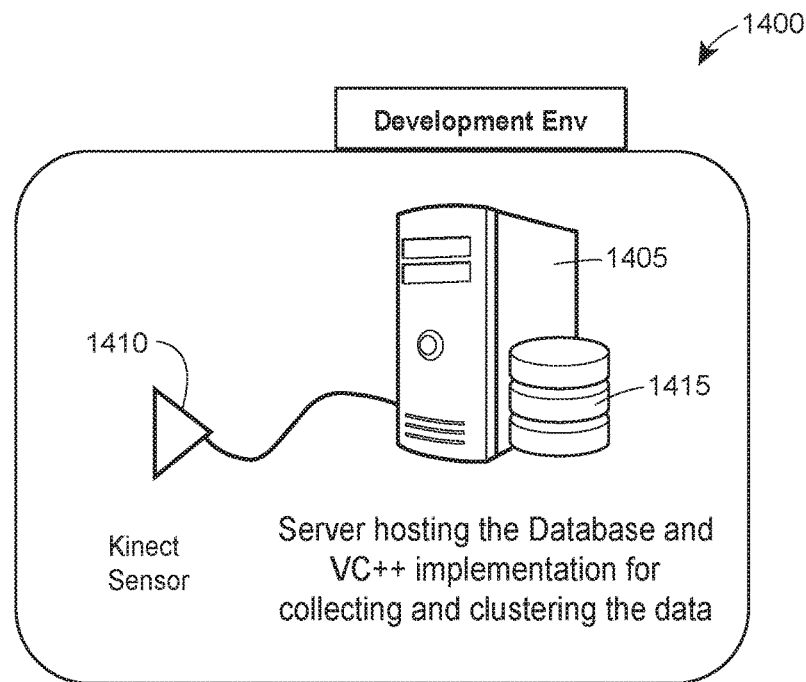
FIG. 14 depicts an example computer system for development of a model for generating data representative of vehicle in-cabin insurance risk evaluations.

Turning to FIG. 14, a high-level block diagram of a development environment 1400 is depicted. The development environment 1400 may include an image sensor 1410 and a server 1405 hosting a database 1415 and VC++ implementation for collecting and clustering data. A user interface of the development environment may have a model car, parked car, or a dummy setup for a user to act as a driver. The system may analyze the movements of the driver during a trial period and may generate two sets of reports: 1) A live video of the skeleton frames with start, end and total time for the ride demo; and 2) A report shown also as charts of different postures and time spent for each posture as depicted, for example, in FIG. 1. The development environment is focused on building a working model of the concept. The end-to-end system uses Microsoft Kinect, Microsoft Visual Studio C++, MySQL database and Microsoft Windows as platform.

Figure 15:
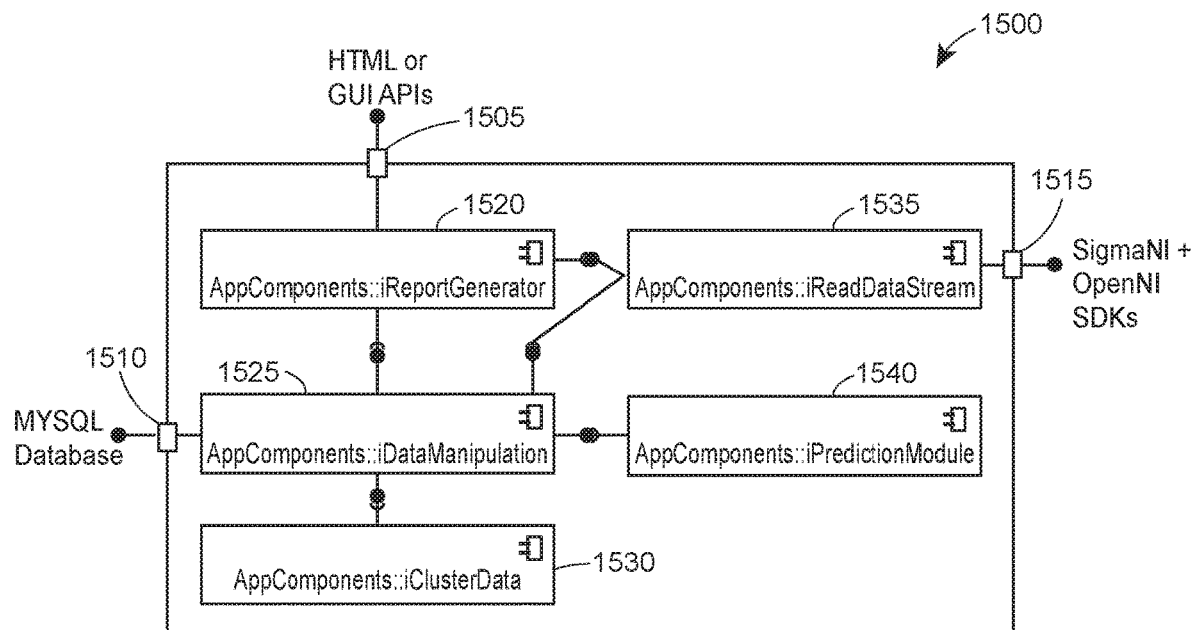
FIG. 15 depicts a block diagram of various components for development of a model for generating data representative of vehicle in-cabin insurance risk evaluations.

With reference to FIG. 15, a system diagram 1500 is depicted for a development environment of FIG. 14. The system 1500 may include HTML and/or GUI APIs 1505, a MYSQL database 1510, and SigmaNI+Open NI SDKs 1515. The system diagram 1500 depicts different C++ modules for different functionalities of the project. The system 1500 may also include an AppComponents::iData-Manipulation component 1525 to interact with the MYSQL database 1510. All other components may use APIs in this component to interact with MYSQL database. The system 1500 may further include an AppComponents::iReadD-ataStream component 1535 to interact with Sensor hardware via KinectSDK middleware (e.g., SigmaNI+Open NI SDKs 1515). The iReadDataStream component 1535 may read a data stream from the sensor (e.g., image sensor 260, 265 of FIG. 1) and may store the data structure in a Snapshot table for further clustering and processing. The system 1500 may also include an AppComponents::iClusterData component 1530 that may read snapshot data stored by the iReadD-ataStream component 1535 and may cluster the data to identify driver postures. The AppComponents::iClusterData component 1530 may begin to function once new data is stored in a database by the iReadDataStream component 1535. The system 1500 may further include an AppComponents::iPredictionModule component 1540 that may function as a prediction engine, and may have algorithms to implement driving habit analysis for the captured data. The system 1500 may also include an AppComponents::iReport-Generator component 1520 that, for successful demonstration, a report will be generated. The AppComponents::iReportGenerator component 1520 may have APIs to read the data via iDataManipulation component 1525 from the database and generate report. This component will also display the live video of the participant on the screen. For the live video, it will capture the data directly from iReadD-ataStream component 1535.

An AppComponents::iDataManipulation 1525 may include input related to business objects acquired from or required by various business methods in other components. Output/Service may be provided for business objects extracted from a database via data access objects and methods. Depending on which component is calling, this component may have generic and client specific APIs for serving various business objects. Component/Entity process: Data connection; Connection pool; DAOs for below entities; Driver; Snapshot Object; RideDetails; and PosturesDetails. Constraints may include initial connection pool size of ten and max size may be thirty.

An AppComponents::iReadDataStream component 1535 may include input for an event to start and stop reading a video and sensor data stream from hardware. A SDK APIs may be used for reading skeleton, face and hand tracking data. Output/Service may be provided via snapshot objects and relevant joints coordinates may be output and stored in the database using Data manipulation component 1525. Live data may be transported to ReportGenerator component 1520. Component/Entity process may work as a batch process to start and stop logging the read data in the database when triggered. The component also needs to be able to transmit live data to iReportGenerator component 1520 to show it on screen. Constraints may include appropriate buffering and error handling which may be done, to make sure appropriate error messages are displayed/captured for downstream components.

An AppComponents::iClusterData component 1530 may input snapshot data read from iReadDataStream and a database. Output/Service may be provided and assign a postureID to a snapshot and update the posture-database. Component/Entity process may include: Retrieving snapshot and posture information from database; Matching snapshots with postures; Inserting new snapshot/posture information to database; Implementations of unsupervised clustering algorithms. Constraints may include a number of clusters generated has a limit.

An AppComponents::iPredictionModule component 1540 may serve to take in data from a database, and turn the data into information to leverage. The AppComponents::

iPredictionModule component 1540 may identify risky drivers, review their in-cabin driving habits, and eventually act to curb these risky habits. This section explains how the data may be modeled to better understand which factors correlate to a defined risk metric and how certain behavior patterns contribute to a higher insurance risk rating.

An AppComponents::iReportGenerator 1520 may include input information taken from a database, the ten coordinates taken from the data stream during a demo, a start time, an elapsed time and some dummy information. Output/Service may be provided including a video of skeleton frames with start time and elapsed time and a report that displays charts that may illustrate what happened during the demo. The report may include a picture of the driver, the driver's name, and the range of movement of most distinct postures. The report may also have a line graph and a bar graph that show how much time the driver spent in each posture. The report may display the skeleton coordinates of the five postures the driver was in the most along with the time and number of occurrences of each. Component/Entity process may include: a Generator; a Report; a Video; a DAOs for below entities; a Ride; a Posture and a Joint. Constraints may include a demo that may have at least five different postures. Number of postures and number of occurrences should not exceed max array length.

Figure 16:
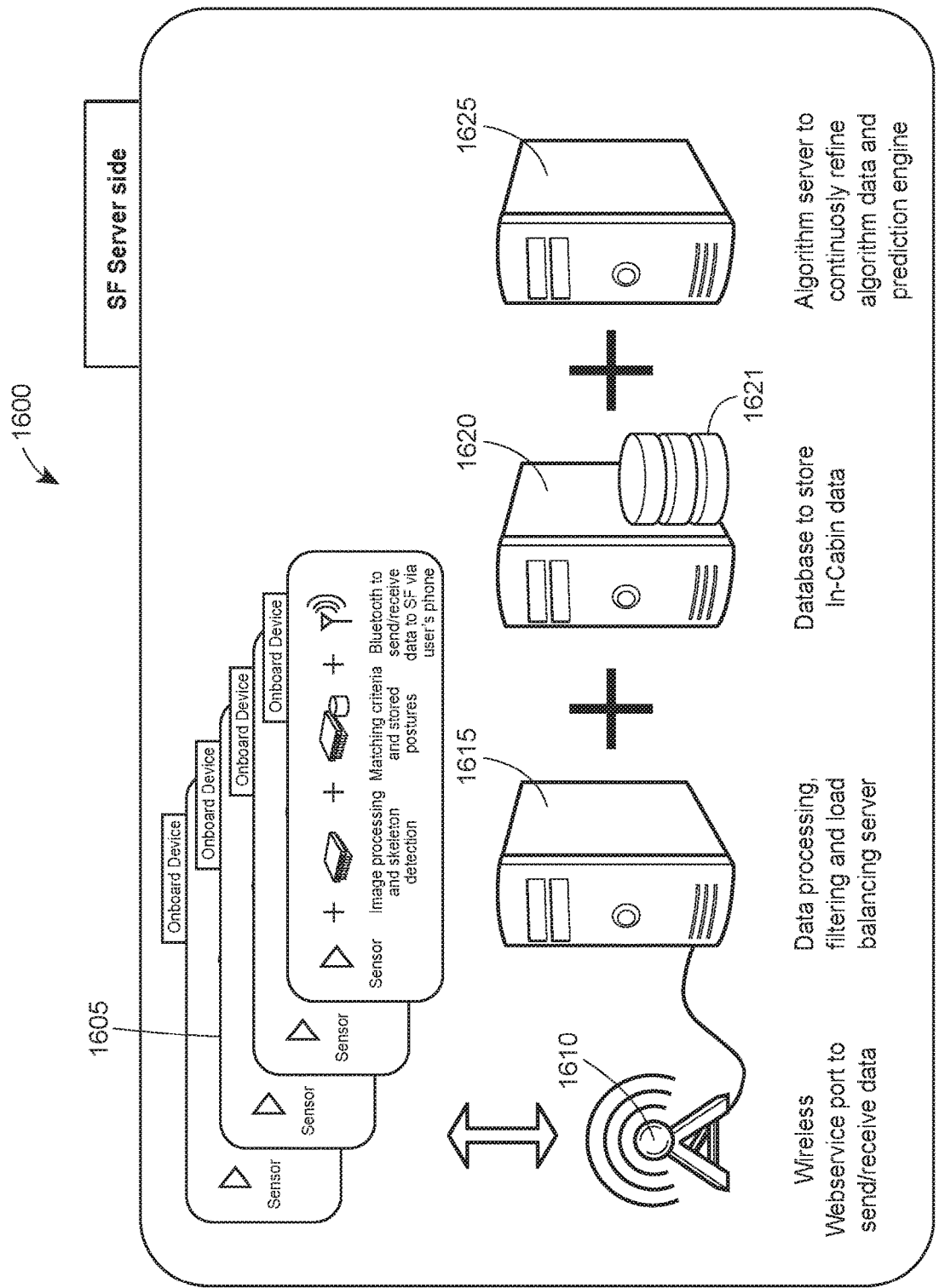
FIG. 16 depicts a block diagram for an example server side system for generating data representative of vehicle in-cabin insurance risk evaluations.

Turning to FIG. 16, a system for generating data representative of a vehicle in-cabin insurance risk evaluation 1600 is depicted. The system 1600 may include a plurality of vehicle devices 1605 communicatively coupled to a data processing, filtering and load balancing server 1615 via a wireless webservice port 1610 to send and receive data. The system 1600 may also include a database server 1620 and database 1621 to store in-cabin data, and an algorithm server 1625 to continuously refine algorithm data and an associated prediction engine. When multiple sensors are used, a SigmaNI wrapper may be used as an abstraction layer for code. This may ensure that if a sensor is changed, or different sensors are user, minimal code changes are required.

Figure 17:
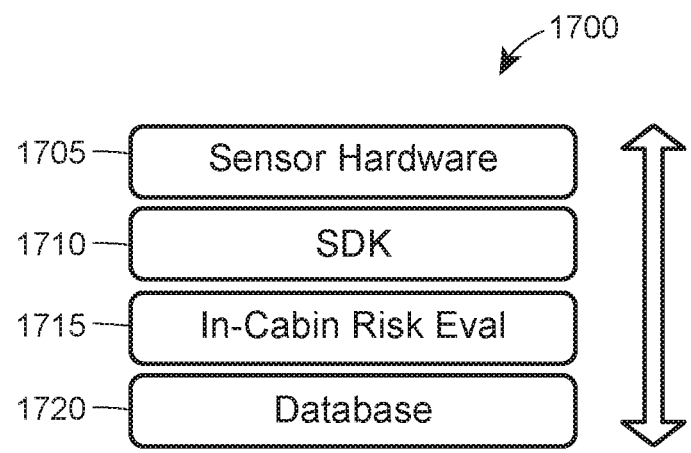
FIG. 17 depicts a flow diagram for example method of directly interacting with the SDK to obtain driver data for use in generating data representative of vehicle in-cabin insurance evaluations.

With reference to FIG. 17, when SigmaNI is not an approved software, an implementation 1700 may directly interact with a SDK 1710 to get the driver data from a sensor 1705 for generation data representative of vehicle in-cabin insurance risk evaluations 1715 and storing the data in a database 1720. The system 1700 may use sensors (e.g., image sensor 260, 265 of FIG. 1) for detecting the driving postures, such as provided by Microsoft Kinect for windows, Carmine 1.09 and/or Softkinect DS325. The following SDKs may be used with the above hardware: a Kinect SDK, an OpenNI, a Softkinect SDK and/or a SigmaNI.

Figure 18:
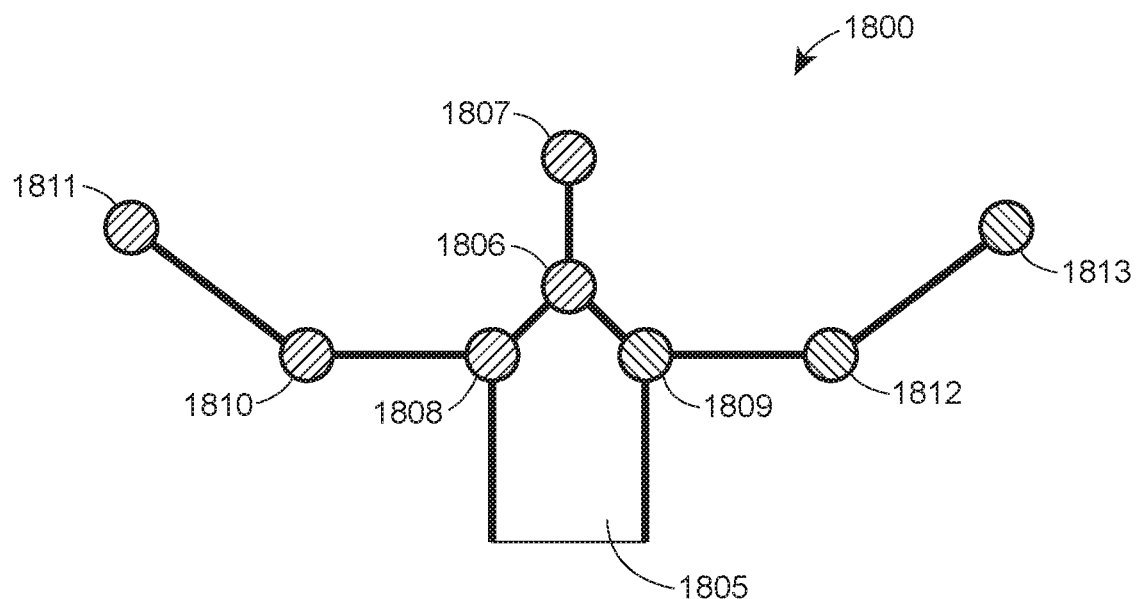
FIG. 18 depicts an example skeletal figure representative of a vehicle driver's upper body position.

Turning to FIG. 18, a posture (or skeletal diagram) 1800 may include ten joint positions 1806-1813 for a driver's upper body 1805. An associated cluster may include ten rounds with radius 10 cm and centered at ten 3-dimensional points. A match (posture p, cluster c) may return true if all the ten joint positions of the posture are contained in the ten balls for the cluster accordingly, otherwise returns false. A distance of two points may be measured using a Euclidean distance. For example, given a pair of 3-D points, p=(p1, p2, p3) and q=(q1, q2, q3): distance (p, q)=sqrt((p1−q1)^2+(p2−q2)^2+(p3−q3)^2). A cube in 3-dimensional consists all points (x, y, z) satisfy following conditions: a<=x<=b, c<=y<=d, e<=z<=f, where b−a=d−c=f−e. When initialization: a first cluster may be defined by the ten joint positions of the first posture. A cluster may be added to the initial cluster list, denote CL Loop: for each of subsequent postures, say P, for each cluster in CL, say C, if Match (P, C): Label P with C, break, End For. If P does not have a cluster label, create a new cluster C' and add C' to CL− End For and BR4 [TR 4.1, 4.2, 4.3 and 4.4] Create risk profile of the driver.

Figure 19:
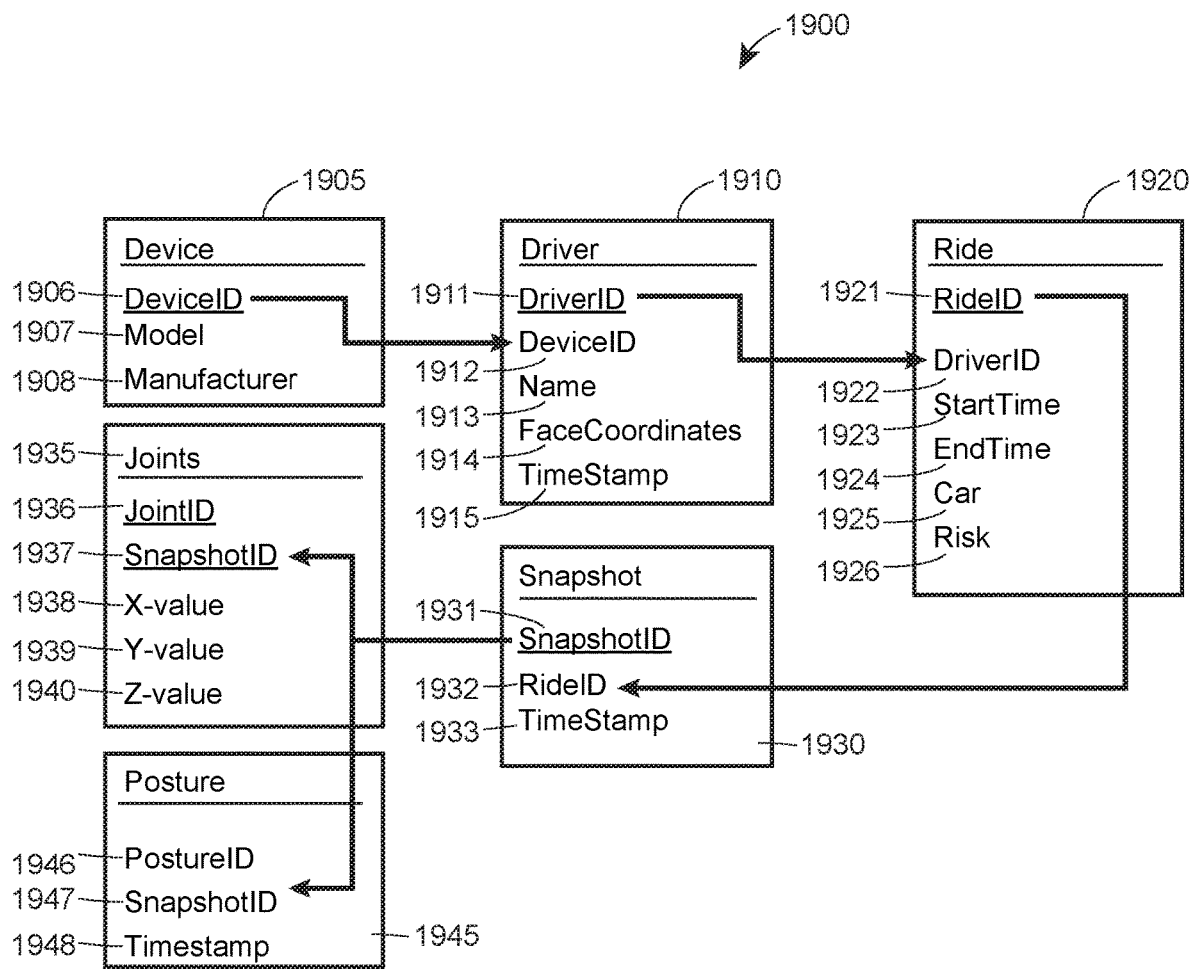
FIG. 19 depicts an example object design for a database for use in generating data representative of vehicle in-cabin insurance risk evaluations.

With reference to FIG. 19, an object design for a detailed entity relationship (E-R) diagram 1900 is depicted. An associated database layer may be developed in MySQL server. The entity relationship 1900 may include a device 1905 connected to a driver 1910, connected to a ride 1920, connected to a snapshot 1930 which is connected to both joints 1935 and a posture 1945. The device 1905 may include a device ID 1906, a model, 1907 and a manufacturer 1908. The driver 1910 may include a driver ID 1911, a device ID 1912, a name 1913, face coordinates 1914, and a time stamp 1915. The ride 1920 may include a ride ID 1921, a driver ID 1922, a start time 1923, an end time 1924, a car 1925, and a risk 1920. The snapshot may include a snapshot ID 1931, a ride ID 1932, and a time stamp 1933. The joints 1935 may include a joint ID 1936, a snapshot ID 1937, a x-value 1938, a y-value 1939, and a z-value 1940. The posture 1945 may include a posture ID 1946, a snapshot ID 1947, and a time stamp 1948.

Figure 20:
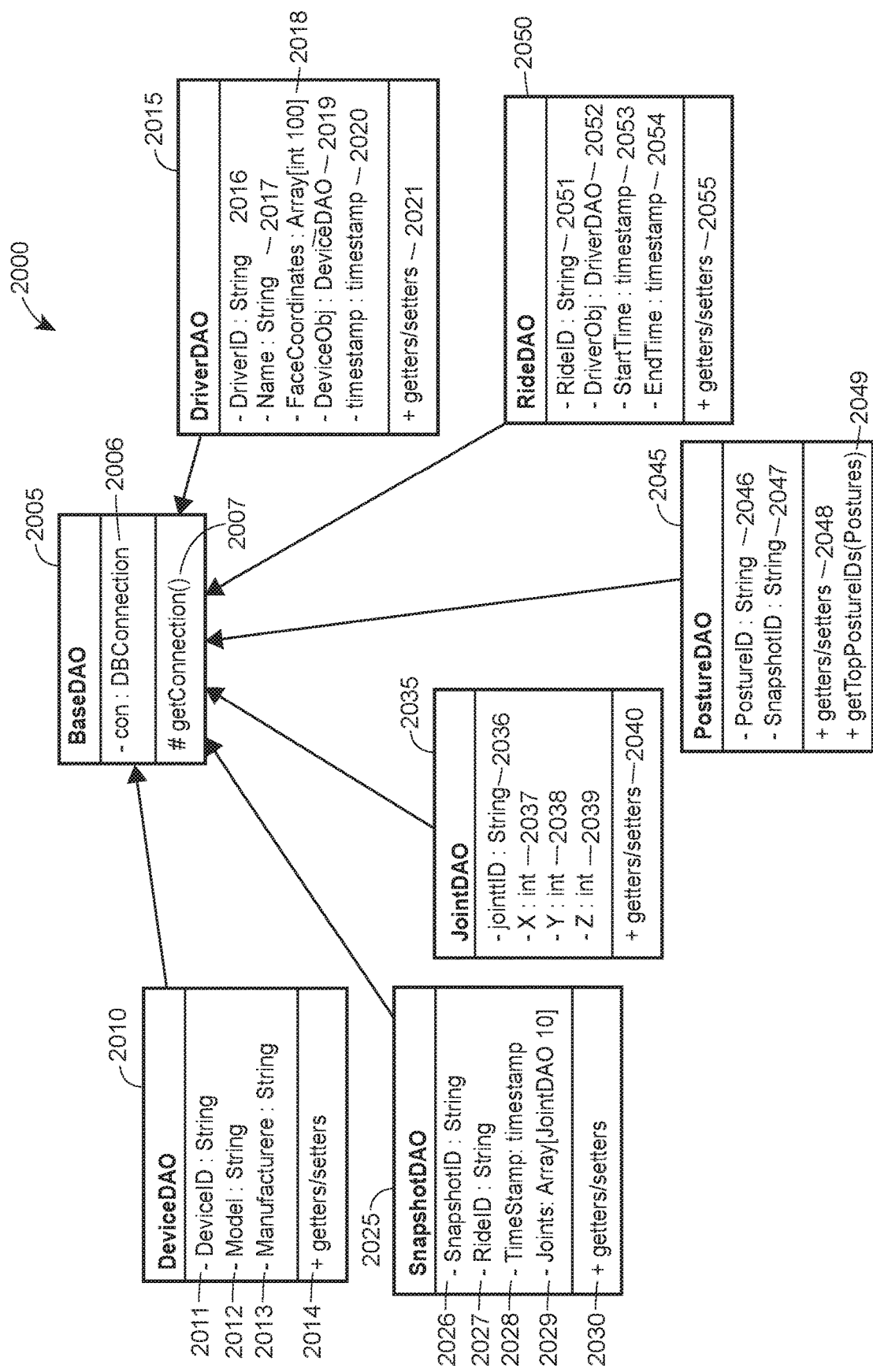
FIGS. 20-23 depict various example class diagrams of objects for use in a database of FIG. 19.

Turning to FIG. 20, a class diagram 2000 may include a BaseDAO 2005, a DeviceDAO 2010, a DriverDAO 2015, a SnapshotDAO 2015, a JointDAO 2035, a Posture-DAO 2045, and a RideDAO 2050. The BaseDAO 2005 may include a con: DBConnection 2006 and a # getConnection( ) 2007. The DeviceDAO 2010 may include a DeviceID: String 2011, a Model: String 2012, a Manufacturer: String 2013, and a getters/setters 2014. The DriverDAO 2015 may include a DriverID: String 2016, a Name: String 2017, a FaceCoordinates: Array(int 100) 2018, a Device Obj: Device DAO 2019, a timestamp: timestamp 2020, and a getters/setters 2012. The SnapshotDAO 2015 may include a SnapshotID: String 2026, a RideID: String 2027, a TimeStamp: timestamp 2028, a Joints: Array (jointDAO 10) 2029, and a getters/setters 2030. The JointDAO 2035 may include a JointID: String 2036, a X: int 2037, a Y: int 2038, a Z: int 2039, and a getters/setters 2040. The PostureDAO 2045 may include a PostureID: String 2046, a SnapshotID: String 2047, a getters/setters 2048, and a fetTopPostureIDs (Postures) 2049. The RideDAO 2050 may include a RideID: String 2051, a DriverObj: DriverDAO 2052, a StartTime: timestamp 2053, an EndTime: timestamp 2054, and a getters/setters 2055.

Figure 21:
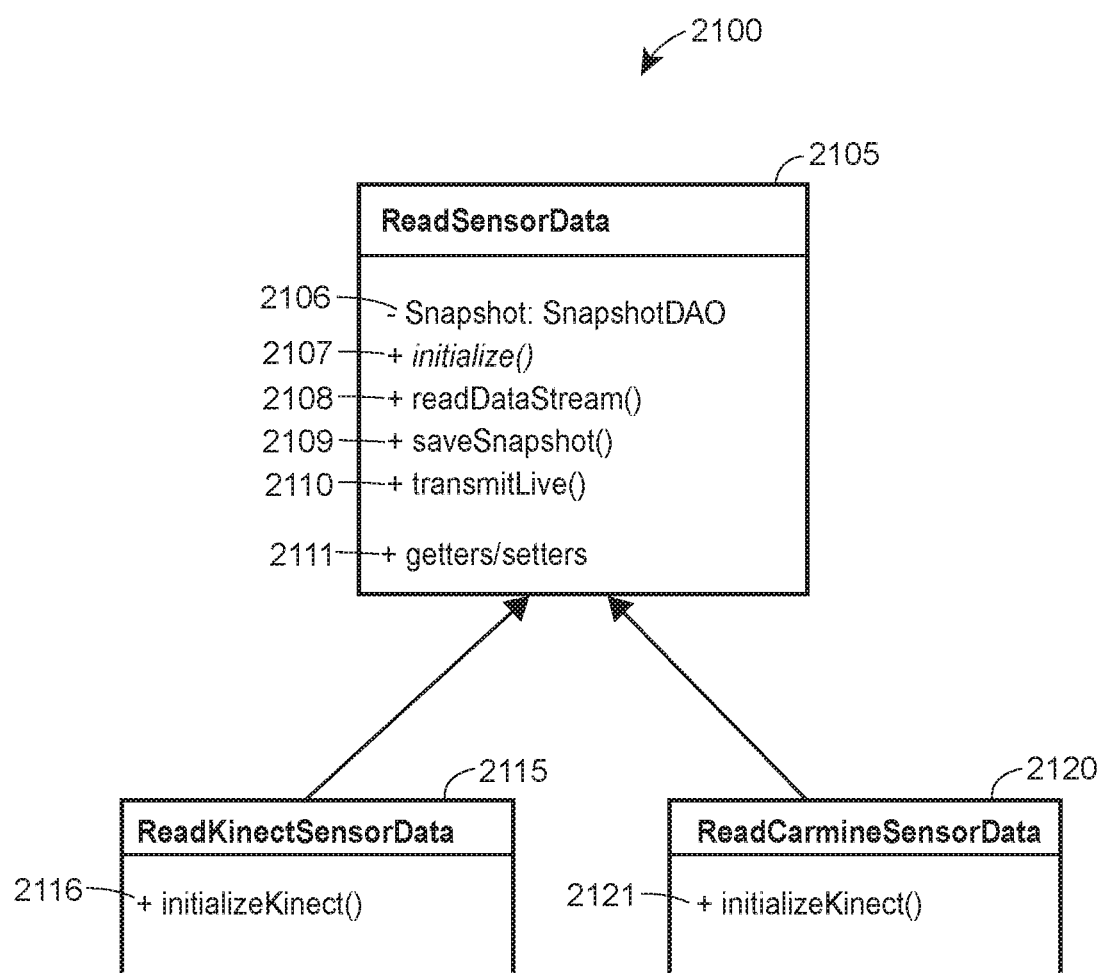

With reference to FIG. 21, a class diagram 2100 may include a ReadSensorData component 2105, a ReadKinectSensorData component 2115, and a ReadCarmineSensorData component 2120. The ReadSensorData component 2105 may include a Snapshot: SnapshotDAO 2106, an initialize( ) parameter 2107, a readDataStream( ) parameter 2108, a saveSnapshot( ) parameter 2109, a transmitLiveOparameter 2110, and agetters/setter parameter 2111. The ReadKinectSensorData component 2115 may include an initializeKinect( ) parameter 2116. The ReadCarmineSensorData component 2120 may include an initializeCarmine( ) parameter 2121.

Figure 22:
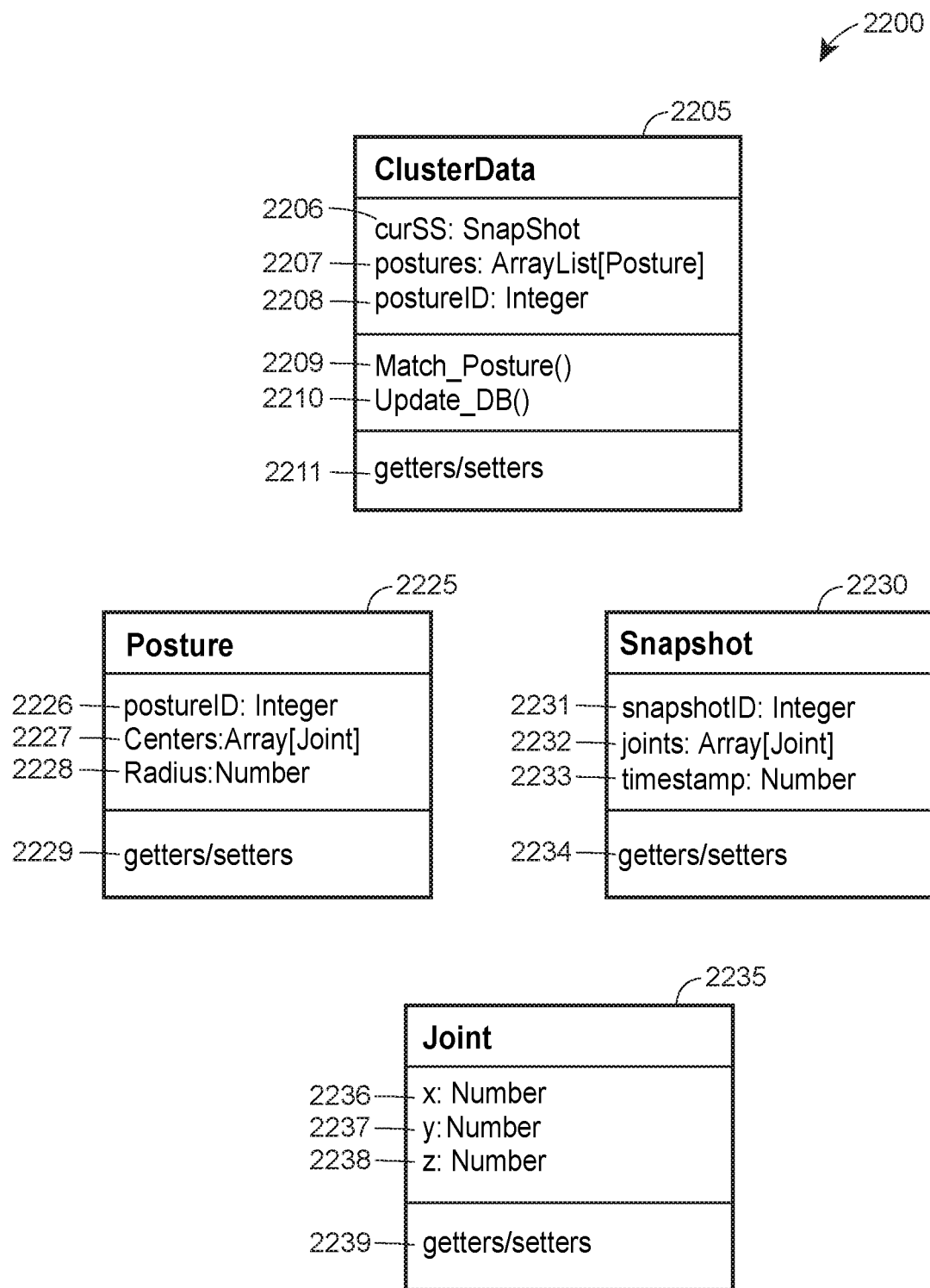

Turning to FIG. 22, a class diagram 2200 may include a ClusterData component 2205, a Posture component 2225, a Snapshot component 2230, and a Joint component 2235. The ClusterData component 2205 may include a surSS: SnapShot 2206, a postures: ArrayList(Posturess) 2207, a postureID integer 2208, a Match_Posture( ) 2209, a Update_DB( ) 2210, and a getters/setters 2211. The Posture component 2225 may include a postureID: integer 2226, a Cneters:Array(Joint) 2227, a Radius:Number 2228, and a getters/setters 2229. The Snapshot component 2230 may include a SnapshotID: Integer 2231, a Joints: Array(Joint)

2232, a timestamp: Number 2233, and a getters/setters 2234. The Joint component 2235 may include a x: Number 2236, a y: Number 2237, a z: Number 2238, and a getters/setters 2239.

Figure 23:
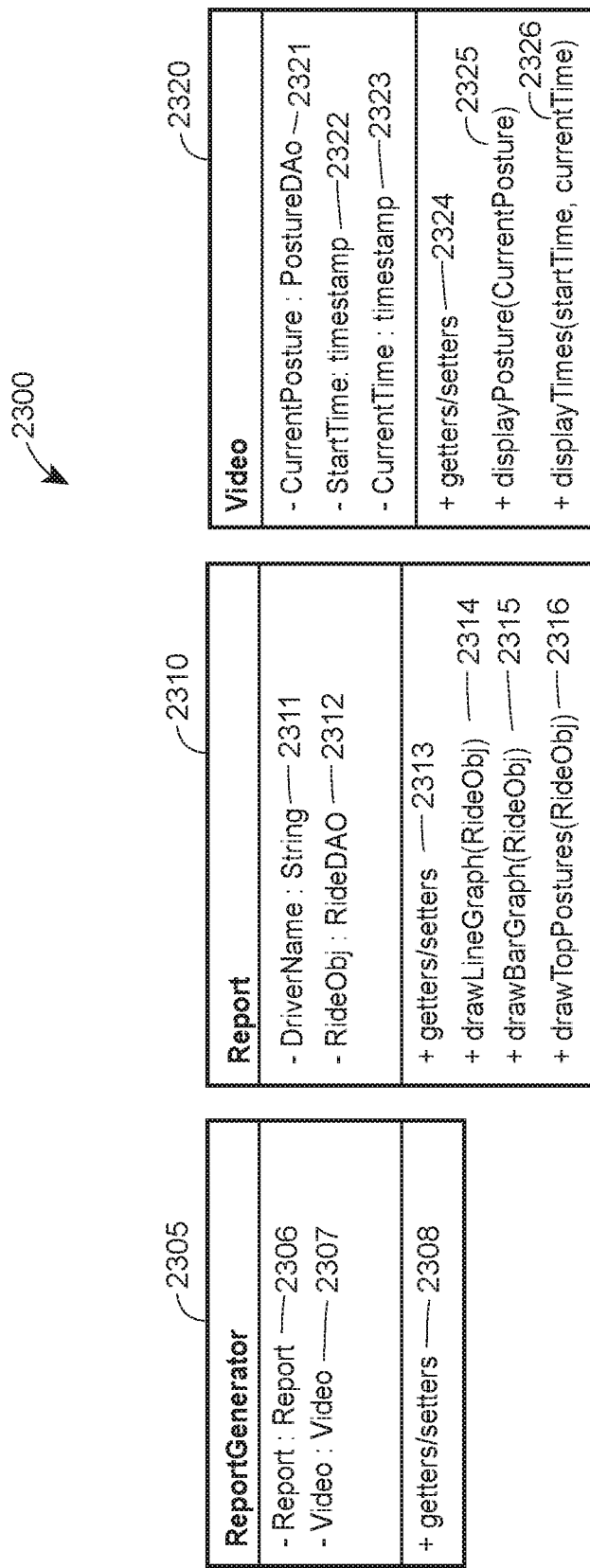

With reference to FIG. 23, a class diagram 2300 may include a ReportGenerator component 2305, a Report component 2310, and a Video component 2320. The ReportGenerator component 2305 may include a Report: Report 2306, a Video: Video 2307, and a getters/setters 2308. The Report component 2310 may include a DriverName: String 2311, a RideObj: RideDAO 2312, a getters/setters 2313, a drawLineGraph(RideObj) 2314, a drawBarGraph(RideObj) 2315, and a drawTopPostures(RideObj) 2316. The Video component 2320 may include a CurrentPosture: PostureDAO 2321, a StartTime: timestamp 2322, a CurrentTime: timestamp 2323, a getters/setters 2324, a displayPosture (CurrentPosture) 2325, and a displayTimes(starTime, currentTime) 2326.

A car-sharing insurance product could more specifically insure the driver, regardless of the car. Traditional underwriting looks at the driver-vehicle combination. What car-sharing would allow you to do is to more heavily weight the risk of the driver alone. The methods and systems of the present disclosure may allow car-sharing to get that risk information on the driver and carry it forward to whatever car they use. This would be tailored for that particular driver's behavior, rather than demographic and vehicle-use factors. This would allow certain car-sharing entities to have a cost advantage. If they are paying less insurance—or more specific insurance—they could pass those savings to their customers and have a retention strategy.

The methods and systems of the present disclosure may allow for emergency responders by, for example, using gesture recognition systems from an aftermarket/insurance device in order to provide an estimate to first responders about the severity of the crash and what kinds of resources/equipment/expertise is required in order to extricate. Using the gesture recognition systems from an aftermarket/insurance device in order to provide an estimate to first responders about the severity of the crash and what kinds of resources/equipment/expertise is required in order to triage—have some idea of what emergency medical needs could be upon arrival. Since the "golden hour" is so critical, and it's not always known how much of that hour has already expired, even a preliminary or broad clue could be helpful in the triage process. The aftermarket gesture recognition device is already operating at the time of the crash. It is collecting data about the driver's position/posture and the location of the arms relative to the body and structures in the vehicle (i.e. the steering wheel). Accelerometers in the device are able to recognize that a crash has occurred (if a pre-determined acceleration threshold has been reached). Upon crash detection the device could transmit via the driver's phone (which is already connected via Bluetooth) or perhaps transmit using an onboard transmitter that uses emergency frequencies (and therefore does not require consumer to pay for data fees). Using gesture recognition from any original equipment or aftermarket gesture tracking device, whether or not for insurance purposes.

The methods and systems of the present disclosure may allow for Transition from Automated to Manual Driving Mode in the case of vehicle automation systems operating the piloting functions with the human in a supervisory role. The vehicle encounters a situation where it needs to transfer control to the driver, but the driver may or may not be ready to resume control. The methods and systems of the present disclosure may allow gesture recognition systems, or any gesture recognition system, to be used to determine if the driver is ready to resume control. If he/she is not ready, then get his/her attention quickly. The gesture recognition would be used to ascertain whether the driver is ready to resume control by evaluating the driver's posture, the location of hands, the orientation of head, body language. Use machine learning to evaluate driver engagement/attention/readiness-to-engage based on those variables. The gesture recognition could be any original in-vehicle equipment or aftermarket device.

The methods and systems of the present disclosure may distinguish between Automated and Manual driving modalities for variable insurance rating for a scenario where there are many vehicles that are capable of automatically operating the piloting functions, and are capable of the driver manually operating the piloting functions. The driver can elect to switch between automated and manual driving modes at any point during a drive. Gesture recognition would be utilized to distinguish whether a driver is operating the vehicle manually, or whether the vehicle is operating automatically. This could be determined through either OEM or aftermarket hardware. The sensors and software algorithms are able to differentiate between automatic and manual driving based on hand movements, head movements, body posture, eye movements. It can distinguish between the driver making hand contact with the steering wheel (to show that he/she is supervising) while acting as a supervisor, versus the driver providing steering input for piloting purposes. Depending on who/what is operating the vehicle would determine what real-time insurance rates the customer is charged.

The methods and systems of the present disclosure may provide a tool for measuring driver distraction where gesture recognition may be used to identify, distinguish and quantify driver distracted for safety evaluation of vehicle automation systems. This would be used to define metrics and evaluate safety risk for the vehicle human-machine interface as a whole, or individual systems in the case where vehicles have automation and vehicle-to-vehicle/vehicle-to-infrastructure communication capabilities. Where Vehicle automation: the vehicle is capable of performing piloting functions without driver input. Where Vehicle-to-vehicle/vehicle-to-infrastructure communication: the vehicle is capable of communicating data about the first vehicle dynamics or environmental traffic/weather conditions around the first vehicle. For any entity looking to evaluate the safety or risk presented by a vehicle with automated driving capabilities, DRIVES gesture recognition could be useful to quantify risk presented by driver distraction resulting from any vehicle system in the cabin (i.e. an entertainment system, a feature that automates one or more functions of piloting, a convenience system). With the rise of vehicle automation systems and capabilities, tools will be needed to evaluate the safety of individual systems in the car, or the car as a whole. Much uncertainty remains about how these systems will be used by drivers (especially those who are not from the community of automotive engineering or automotive safety). Determining whether they create a net benefit to drivers is a big question. The methods and systems of the present disclosure may allow gesture recognition could be used to identify the presence of distracted driving behaviors that are correlated with the presence of vehicle automation capabilities. The distracted could be quantified by duration that the driver engages in certain behaviors. Risk quantification may also be measured by weighting certain behaviors with higher severity than other behaviors, so the duration times are weighted. Risk quantification may also differentiate subcategories of behaviors based on degree of motion of hands, head, eyes, body. For example, The methods and systems of the present disclosure may distinguish texting with the phone on the steering wheel from texting with the phone in the driver's lap requiring frequent glances up and down. The latter would be quantified with greater risk in terms of severity of distraction. The purpose of this risk evaluation could be for reasons including but not limited to adhere to vehicle regulations, providing information to the general public, vehicle design testing or insurance purposes.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A device for determining vehicle operator gestures and providing the vehicle operator gestures to at least one individual other than the vehicle operator, the device comprising:
   a previously classified image data receiving module stored on a memory that, when executed by a processor, causes the processor to receive previously classified image data from at least one previously classified image database, wherein the previously classified image data is representative of previously classified vehicle operator gestures;
   a current image data receiving module stored on a memory that, when executed by a processor, causes the processor to receive current image data from at least one vehicle interior sensor, wherein the current image data is representative of current vehicle operator gestures, wherein the current image data is representative of rotated and scaled postures that are normalized for a range of different vehicle operators, and wherein the current image data includes images and/or extracted image features that are representative of a vehicle occupant interacting with an electronic device, a vehicle occupant interacting with an onboard computer interface, a vehicle occupant using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, a vehicle occupant eating, or a vehicle occupant drinking;
   a current image data classification module stored on a memory that, when executed by a processor, causes the processor to classify the current image data by comparing the current image data to the previously classified image data, wherein the currently classified image data is representative of at least one current vehicle operator gesture; and
   a currently classified image data transmission module stored on a memory that, when executed by a processor, causes the processor to transmit the currently classified image data to at least one other vehicle.

2. The device as in claim 1, wherein the at least one vehicle interior sensor is selected from: at least one digital image sensor, at least one ultra-sonic sensor, at least one radar-sensor, at least one infrared light sensor, or at least one laser light sensor.

3. The device as in claim 1, wherein at least one vehicle operator gesture is determined using a probability function, and wherein a probability of a crash occurring is determined by analyzing at least one of: a current state of one or more drivers, dynamics of one or more vehicles, trajectories of one or more vehicles, locations of one or more road side equipment, locations of one or more infrastructure fixtures, locations of one or more road users, trajectories of one or more road users, trajectories of one or more pedestrians, or locations of one or more pedestrians.

4. The device as in claim 1, wherein the current image data is representative of a three-dimensional representation of at least one occupant within the vehicle interior.

5. The device as in claim 1, wherein the previously classified image data is representative of a three-dimensional representation of at least one occupant within the vehicle interior.

6. The device as in claim 1, wherein the previously classified image data includes images and/or extracted image features that have previously been classified as being representative of a vehicle occupant interacting with an electronic device, a vehicle occupant interacting with an onboard computer interface, a vehicle occupant using a mobile device, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, a vehicle occupant eating, or a vehicle occupant drinking.

7. A computer-implemented method for determining vehicle operator gestures and for transmitting the vehicle operator gestures to at least one individual other than the vehicle operator, the method comprising:
   receiving, at a processor of a computing device, previously classified image data from at least one previously classified image database in response to the processor executing a previously classified image data receiving module, wherein the previously classified image data is representative of previously classified vehicle operator gestures;
   receiving, at a processor of a computing device, current image data from at least one vehicle interior sensor a current image data receiving module, in response to the processor executing a current image data receiving module, wherein the current image data is representative of at least one current vehicle operator gesture, wherein the current image data is representative of rotated and scaled postures that are normalized for a range of different vehicle operators, and wherein the current image data includes images and/or extracted image features that are representative of a vehicle occupant interacting with an onboard computer interface, a vehicle occupant interacting with an electronic device, a vehicle occupant interacting with an onboard computer interface, vehicle occupant locations/orientations, cellular telephone locations/orientations, vehicle occupant eye locations/orientations, vehicle occupant head location/orientation, vehicle occupant hand location/orientation, a vehicle occupant torso location/orientation, a seat belt location, or a vehicle seat location/orientation;
   classifying, using a processor of a computing device, at least one gesture associated with a vehicle operator, based on a comparison of the current image data with the previously classified image data, in response to the processor executing a current image data classification module; and transmitting, using a processor of a computing device, the currently classified image data to at least one other vehicle, in response to the processor executing a currently classified image data transmission module.

8. The method as in claim 7, wherein the at least one vehicle interior sensor is selected from: at least one digital image sensor, at least one ultra-sonic sensor, at least one radar-sensor, at least one infrared light sensor, or at least one laser light sensor.

9. The method as in claim 7, wherein the current image data is representative of either a two-dimensional or a three-dimensional representation of at least one occupant within the vehicle interior.

10. The method as in claim 7, wherein at least one vehicle operator gesture is determined using a probability function, and wherein a probability of a crash occurring is determined by analyzing at least one of: a current state of one or more drivers, dynamics of one or more vehicles, trajectories of one or more vehicles, locations of one or more road side equipment, locations of one or more infrastructure fixtures, locations of one or more road users, trajectories of one or more road users, trajectories of one or more pedestrians, or locations of one or more pedestrians.

11. The method as in claim 7, wherein the previously classified image data is representative of a three-dimensional representation of at least one occupant within the vehicle interior.

12. The method as in claim 7, wherein the previously classified image data includes images and/or extracted image features that have previously been classified as being representative of known vehicle occupant interacting with an electronic device, vehicle occupant interacting with an onboard computer interface, vehicle occupant locations/orientations, known cellular telephone locations/orientations, known vehicle occupant eye locations/orientations, known vehicle occupant head location/orientation, known vehicle occupant hand location/orientation, a known vehicle occupant torso location/orientation, a known seat belt location, or a known vehicle seat location/orientation.

13. A non-transitory computer-readable medium storing computer-readable instructions that, when executed by a processor, cause the processor to determine degrees of vehicle operator risk, the non-transitory computer-readable medium comprising:

a previously classified image data receiving module that, when executed by a processor, causes the processor to receive previously classified image data from at least one previously classified image database, wherein the previously classified image data is representative of previously classified vehicle operator risk;

a current image data receiving module that, when executed by a processor, causes the processor to receive current image data from at least one vehicle interior sensor, wherein the current image data is representative of current vehicle operator risk, wherein the current image data is representative of rotated and scaled postures that are normalized for a range of different vehicle operators, and wherein the current image data includes images and/or extracted image features that are representative of a vehicle occupant interacting with an electronic device, a vehicle occupant interacting with an onboard computer interface, a vehicle occupant using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, or a vehicle occupant looking at themselves in a mirror, vehicle occupant locations/orientations, cellular telephone locations/orientations, vehicle occupant eye locations/orientations, vehicle occupant head location/orientation, vehicle occupant hand location/orientation, a vehicle occupant torso location/orientation, a seat belt location, or a vehicle seat location/orientation;

a current image data classification module that, when executed by a processor, causes the processor to classify the current image data by comparing the current image data to the previously classified image data, wherein the currently classified image data is representative of at least one current vehicle operator gesture; and a currently classified image data transmission module that, when executed by a processor, causes the processor to transmit the currently classified image data to at least one other vehicle.

14. The non-transitory computer-readable medium as in claim 13, wherein the vehicle operator degree of risk is determined using a probability function, and wherein a probability of a crash occurring is determined by analyzing at least one of: a current state of one or more drivers, dynamics of one or more vehicles, trajectories of one or more vehicles, locations of one or more road side equipment, locations of one or more infrastructure fixtures, locations of one or more road users, trajectories of one or more road users, trajectories of one or more pedestrians, or locations of one or more pedestrians.

15. The non-transitory computer-readable medium as in claim 13, wherein the current image data is representative of a three-dimensional representation of at least one occupant within the vehicle interior.

16. The non-transitory computer-readable medium as in claim 13, wherein the previously classified image data includes images and/or extracted image features that have previously been classified as being representative of a vehicle occupant interacting with an electronic device, a vehicle occupant interacting with an onboard computer interface, a vehicle occupant using a cellular telephone, a vehicle occupant looking out a vehicle side window, a vehicle occupant adjusting a vehicle radio, a vehicle occupant adjusting a vehicle heating, ventilation and air conditioning system, two vehicle occupants talking with one-another, a vehicle occupant reading a book or magazine, a vehicle occupant putting on makeup, a vehicle occupant looking at themselves in a mirror, known vehicle occupant locations/orientations, known cellular telephone locations/orientations, known vehicle occupant eye locations/orientations, known vehicle occupant head location/orientation, known vehicle occupant hand location/orientation, a known vehicle occupant torso location/orientation, a known seat belt location, or a known vehicle seat location/orientation.

17. The non-transitory computer-readable medium as in claim 13, wherein the previously classified image data is representative of a three-dimensional representation of at least one occupant within the vehicle interior.

* * * * *